United States Patent
Toba et al.

(10) Patent No.: US 9,952,114 B2
(45) Date of Patent: Apr. 24, 2018

(54) PHYSICAL QUANTITY MEASURING DEVICE AND METHOD OF MANUFACTURING THE SAME

(71) Applicant: NAGANO KEIKI CO., LTD., Tokyo (JP)

(72) Inventors: Hiroyuki Toba, Tokyo (JP); Hidebumi Seki, Tokyo (JP); Tomohiro Rokugawa, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 389 days.

(21) Appl. No.: 14/666,542

(22) Filed: Mar. 24, 2015

(65) Prior Publication Data
US 2015/0276537 A1  Oct. 1, 2015

(30) Foreign Application Priority Data

Mar. 26, 2014  (JP) .................................. 2014-063678

(51) Int. Cl.
| | |
|---|---|
| *G01L 27/00* | (2006.01) |
| *G01L 7/08* | (2006.01) |
| *G01L 19/14* | (2006.01) |

(52) U.S. Cl.
CPC .............. *G01L 27/002* (2013.01); *G01L 7/08* (2013.01); *G01L 19/148* (2013.01)

(58) Field of Classification Search
CPC .................................................. G01L 27/002
See application file for complete search history.

(56) References Cited

U.S. PATENT DOCUMENTS

| 4,756,193 A * | 7/1988 | Luettgen ............... G01L 19/003 |
| | | 29/621.1 |
| 4,967,047 A * | 10/1990 | Betterton ........... H01H 35/2614 |
| | | 200/51 R |
| 2006/0042394 A1 | 3/2006 | Kosh et al. |
| 2012/0067130 A1 | 3/2012 | Kaiser et al. |

FOREIGN PATENT DOCUMENTS

| DE | 102007031980 | 1/2009 |
| DE | 102009045790 | 4/2011 |
| EP | 0922946 | 6/1999 |

(Continued)

OTHER PUBLICATIONS

European Search Report dated Sep. 7, 2015, 12 pages.
Japanese Office Action dated Nov. 8, 2016, English translation included, 5 pages.

*Primary Examiner* — Robert R Raevis
(74) *Attorney, Agent, or Firm* — Rankin, Hill & Clark LLP

(57) ABSTRACT

A circuit board including an electronic circuit unit and electronic adjusting units is disposed in a case. A signal transmitting member connected to the circuit board is mounted in a mount hole of a cover member. Operation holes corresponding to a plurality of operable portions of the electronic adjusting units are provided to the cover member. A cap member including a plurality of cap bodies and a connection portion connecting the cap bodies is attached to the cover member to close the operation holes. The operation holes for adjusting the electronic adjusting units are thus covered/uncovered by the simple cap member. The operation holes are reliably waterproofed by the cap member.

9 Claims, 18 Drawing Sheets

(56) References Cited

FOREIGN PATENT DOCUMENTS

| | | |
|---|---|---|
| GB | 2180656 | 4/1987 |
| GB | 2499556 | 8/2013 |
| JP | 62-69137 | 4/1987 |
| JP | 4-134044 | 12/1992 |
| JP | 2540967 | 4/1997 |
| JP | 11-118647 | 4/1999 |
| JP | 2006-338998 | 12/2006 |
| JP | 2007-188835 | 7/2007 |
| JP | 2013-114998 | 6/2013 |

* cited by examiner

PHYSICAL QUANTITY MEASURING DEVICE AND METHOD OF MANUFACTURING THE SAME

The entire disclosure of Japanese Patent Application No. 2014-063678 filed Mar. 26, 2014 is expressly incorporated by reference herein.

TECHNICAL FIELD

The present invention relates to a physical quantity measuring device for measuring a pressure and/or any other physical quantity of a fluid to be measured, and a method of manufacturing the physical quantity measuring device.

BACKGROUND ART

Physical quantity measuring devices include: a pressure transmitter including a detector that detects a physical quantity; and a circuit board that receives the detection signal from the detector and outputs a signal to an external device.

A typical example of the pressure transmitter is a pressure sensor including a housing, a pressure transducer housed in the housing, an electric circuit, and a connector terminal, the pressure transducer outputting a signal to an external device through the electric circuit and the connector terminal (see Patent Literature 1: Japanese Utility Model Registration No. 2540967).

In the typical device of Patent Literature 1, the connector terminal is provided to a connector body, and an electronic circuit board provided with the electric circuit is disposed in a space defined by the connector body and the housing. A trimmer or the like is adjusted by operating a variable resistor, which is provided to the electric circuit, with a tool such as a driver. The connector body includes a cylindrical portion covering the connector terminal, the cylindrical portion being provided therein with a plurality of adjustment holes required for the operation with the driver. The adjustment holes are each closed with a rubber stopper and sealed with a sealing material.

Another typical example of the pressure transmitter is a pressure detector including: a base; an upper cover; a circuit board disposed in a space defined between the base and the upper cover; and a pressure detector provided to the circuit board, the pressure detector outputting a detection signal to an external device through the circuit board and a lead wire (see Patent Literature 2: JP-A-11-118647).

In the typical device of Patent Literature 2, the circuit board is provided with a trimmer for adjusting a preset pressure of the pressure detector, the trimmer being operable when a trimmer cover provided to the upper cover is removed. One side of the trimmer cover is rotatably attached to the upper cover with a rotation shaft.

In the typical device of Patent Literature 1, when the electric circuit is adjusted, the adjustment holes are each closed with the rubber stopper and then sealed. Thus, once the adjustment holes are each closed by the rubber stopper, the electric circuit cannot be adjusted again. Even if the rubber stopper is removed, the driver cannot be inserted into the adjustment holes provided in the cylindrical portion, after the tip end of the connector terminal is connected to a connection member.

Therefore, in the typical device of Patent Literature 1, after device assembly is completed, it is difficult to adjust the electric circuit.

In the typical device of Patent Literature 2, since the trimmer cover is rotatably attached to the upper cover with the rotation shaft, the trimmer is adjustable when the trimmer cover is removed even after device assembly is completed.

However, the typical device of Patent Literature 2 employs a complicated arrangement where the trimmer cover is attached to the upper cover with the rotation shaft, which results in high production costs of the device.

SUMMARY OF THE INVENTION

An object of the invention is to provide a physical quantity measuring device and a method of manufacturing the physical quantity measuring device, the physical quantity measuring device including a cap member with a simple arrangement capable of covering and uncovering an operation hole for adjustment of an electronic adjusting unit even after device assembly is completed.

A physical quantity measuring device includes: a cylindrical case having a first open end and a second open end; a detector provided to the first open end of the case to detect a physical quantity of a fluid to be measured; a cover member attached to the second open end of the case; a circuit board disposed in the case, the circuit board including: an electronic circuit unit configured to detect a detection signal from the detector, and an electronic adjusting unit configured to adjust the electronic circuit unit, the electronic adjusting unit including a plurality of operable portions; a signal transmitting member mounted on the cover member and connected to the circuit board, the cover member being provided with a mount hole for mounting the signal transmitting member and an operation hole allowing the plurality operable portions to be operated to adjust the electronic adjusting unit; and a cap member provided to the cover member to cover the operation hole, the cap member including: a plurality of cap bodies removably attachable to the operation hole; and a uniting portion configured to unite the cap bodies.

In the above aspect, the detector detects a physical quantity of the fluid to be measured. The detection signal from the detector is transmitted to the electronic circuit unit and then outputted from the circuit board to an external device through the signal transmitting member. The electronic adjusting unit for adjusting the electronic circuit unit is sometimes adjusted by operating necessary one of the operable portions with a tool such as a driver inserted through the operation hole provided to the cover member.

In order to operate the operable portion, the plurality of cap bodies are simultaneously removed or merely one of the cap bodies is removed to uncover the operation hole. The plurality of cap bodies are united together by the uniting portion and thus are not separated from each other. After the adjustment of the electronic adjusting unit is completed, the uncovered operation hole is covered by the cap body or cap bodies.

In the above aspect, the plurality of cap bodies are removably attachable to the operation hole. Since the operation hole is independent of the mount hole, the electronic adjusting unit can be adjusted through the operation hole even when the signal transmitting member mounted in the mount hole is connected to any other connection member. Further, the cap member, which includes the plurality of cap bodies and the uniting portion uniting the cap bodies, is structurally simple.

Therefore, in the above aspect, the operation hole for adjusting the electronic adjusting unit can be easily covered and uncovered by the cap member with the simple arrangement.

In the above aspect, it is preferable that the physical quantity measuring device further include an elastic linear loss-preventing member having a first end connected to the uniting portion and a second end engageable with the cover member.

With the above arrangement, the cap member is undetachable from the cover member. The cap member can be prevented from being inadvertently left removed. Further, the linear loss-preventing member exhibits elasticity and the cap member can be laid at a position remote from the operation hole during adjustment of the electronic adjusting unit, thereby facilitating the adjustment of the electronic adjusting unit.

In the above aspect, it is preferable that the cover member include: a cover body having a bottom surface facing an inside of the case; and a step projecting from a surface of the cover body opposite with the bottom surface, the step defining therein the operation hole comprising operation holes and a hole portion for inserting the linear loss-preventing member, the hole portion being disposed between adjacent ones of the operation holes and penetrating through the step and the cover body, the cap bodies each include: an outer wall having an inner circumferential surface engageable with an outer circumferential surface of the step; an inner wall having an outer circumferential surface engageable with an inner circumferential surface of one of the operation holes; and a top plate connected to a base edge of the outer wall and a base edge of the inner wall, the uniting portion include a uniting plate integral with the top plate, and the first end of the linear loss-preventing member is connected to the uniting plate, whereas the second end of the linear loss-preventing member is engageable with the hole portion.

In the above arrangement, the operation holes are provided to the step disposed at a level higher than that of the cover body, and each of the cap bodies has the inner wall engageable with the inner circumferential surface of one of the operation holes and the outer wall engageable with the outer circumferential surface of the step. Therefore, even when the physical quantity measuring device is used under an environment requiring waterproofing (e.g., used outside or in a ship), water can be reliably prevented from entering the case through the operation holes.

Further, the linear loss-preventing member, which is inserted into the hole portion disposed between adjacent one of the operation holes, has the first end connected to the uniting plate disposed at the center of the cap member. A space between the operation holes is thus efficiently used as a space for inserting the linear loss-preventing member, which results in downsizing the cover member.

In the above aspect, it is preferable that the linear loss-preventing member include a retaining portion at the second end thereof, the retaining portion being configured to prevent the second end of the linear loss-preventing member from coming out of the case through the hole portion.

With the above arrangement, the linear loss-preventing member has the second end provided with the retaining portion, so that the cap bodies are reliably prevented from coming out of the cover member.

In the above aspect, it is preferable that the cover member further include a cylindrical portion disposed adjacent to the step, the cylindrical portion defining therein the mount hole for the signal transmitting member, the cap member further include a recess shaped in conformity with an outer circumferential shape of the cylindrical portion, and the top plate is provided with an identification sign for identifying the plurality of operable portions.

With the above arrangement, the cap member is provided with the recess shaped in conformity with the outer circumferential surface of the cylindrical portion, so that the cap member in a proper position can be attached to the operation holes. Further, the top plate is provided with the identification sign (e.g., a mark or a color) for identifying the operating portions, so that when the cap member is removed to operate one of the operating portions, wrong one of the operating portions can be kept from being operated.

In the above aspect, it is preferable that the cover member further include an indentation having a bottom surface provided with the operation hole, the cap bodies each further include: an outer wall having an outer surface engageable with an inner circumferential surface of the indentation; and a top plate connected to a base edge of the outer wall, the uniting portion further include: a uniting plate integral with the top plate; a uniting wall integral with the outer wall, the uniting wall having a base edge connected to the uniting plate, and the first end of the linear loss-preventing member is connected to a distal edge of the outer wall, whereas the second end of the linear loss-preventing member is engageable with the cover member.

With the above arrangement, the indentation of the cover member, the outer wall and the uniting wall are firmly closed to provide a high waterproof effect. Further, the first end of the linear loss-preventing member is connected to the edge of the outer wall, so that when the cap member is removed, the operation hole is widely uncovered. The operable portion can thus be easily operated.

In the above aspect, it is preferable that when the cap member is attached to the indentation, an outer periphery of the top plate and an outer periphery of the uniting plate define an inclined surface continuous with an outer surface of the cover member opposite with the bottom surface.

With the above arrangement, the projection of the cap member from the cover member is not noticeable due to the presence of the inclined surface, so that the cap member attached to the cover member is not visually annoying.

In the above aspect, it is preferable that the cover member include: a cover body having a bottom surface, the cover body being provided with the operation hole including a plurality of operation holes; and a step projecting from an outer surface of the cover body opposite with the bottom surface, the operation holes being partly defined in the step, the plurality of cap bodies include a first cap body and a second cap body, the first cap body include: an outer wall having an inner circumferential surface engageable with an outer circumferential surface of the step; and a top plate connected to a base edge of the outer wall, the second cap body include: a conical portion having an outer circumferential surface engageable with an inner circumferential surface of one of the operation holes; and a top plate connected to a base end of the conical portion, and the uniting portion include an elastic linear member configured to connect the outer wall of the first cap body and the top plate of the second cap body.

With the above arrangement, the plurality of cap bodies are united together by the uniting portion, so that one of the cap bodies removed from the operation hole can be prevented from being lost as long as the other cap body is kept attached to the operation hole.

The operation holes include an operation hole requiring waterproofing, which is provided to the step, so that water is unlikely to enter through the operation hole provided to the step and a waterproof effect can be enhanced. Since the plurality of cap bodies have different shapes, the cap bodies are each prevented from being attached to wrong one of the operation holes.

According to a second aspect of the invention, a method of manufacturing the physical quantity measuring device includes: attaching the detector to the first open end of the case; attaching the signal transmitting member and the cap member to the cover member; and bonding the cover member to the second open end of the case, in which in attaching the cap member to the cover member, the linear loss-preventing member is inserted into the hole portion until the second end of the linear loss-preventing member is exposed from a bottom-side open end of the hole portion; and a retaining portion is provided on the second end of the linear loss-preventing member.

With the above arrangement, prior to the insertion of the linear loss-preventing member into the hole portion, the first end of the linear loss-preventing member is reliably connected to the uniting plate, thereby efficiently manufacturing the above device. It should be noted that the attachment of the signal transmitting member to the cover member and the attachment of the cap member to the cover member are not necessarily performed in this order.

BRIEF DESCRIPTION OF DRAWING(S)

DESCRIPTION OF EMBODIMENT(S)

Exemplary embodiment(s) of the invention will be described with reference to the attached drawings.

First Exemplary Embodiment

FIGS. 1 to 12 show a first exemplary embodiment.

FIGS. 1 to 5 show an overall arrangement of a physical quantity measuring device according to the first exemplary embodiment. The physical quantity measuring device according to the first exemplary embodiment is used, for instance, in a ship or the like.

Figure 1:
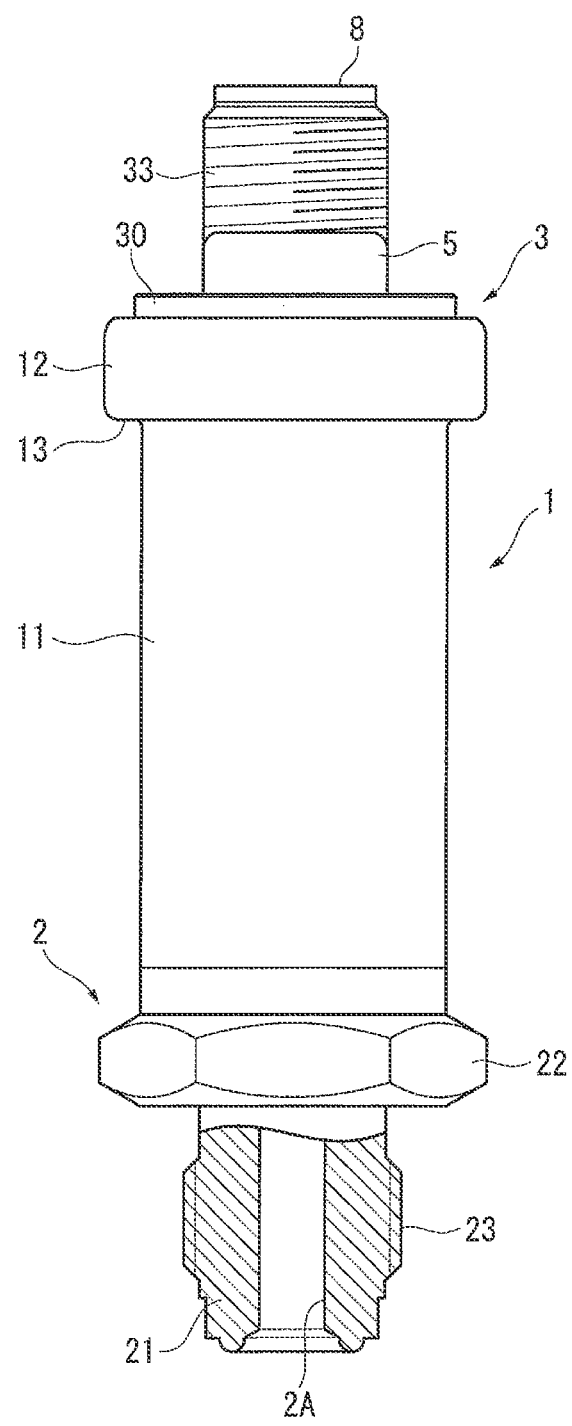
FIG. 1 is a partially broken side elevational view showing a physical quantity measuring device according to a first exemplary embodiment of the invention.
Figure 2:
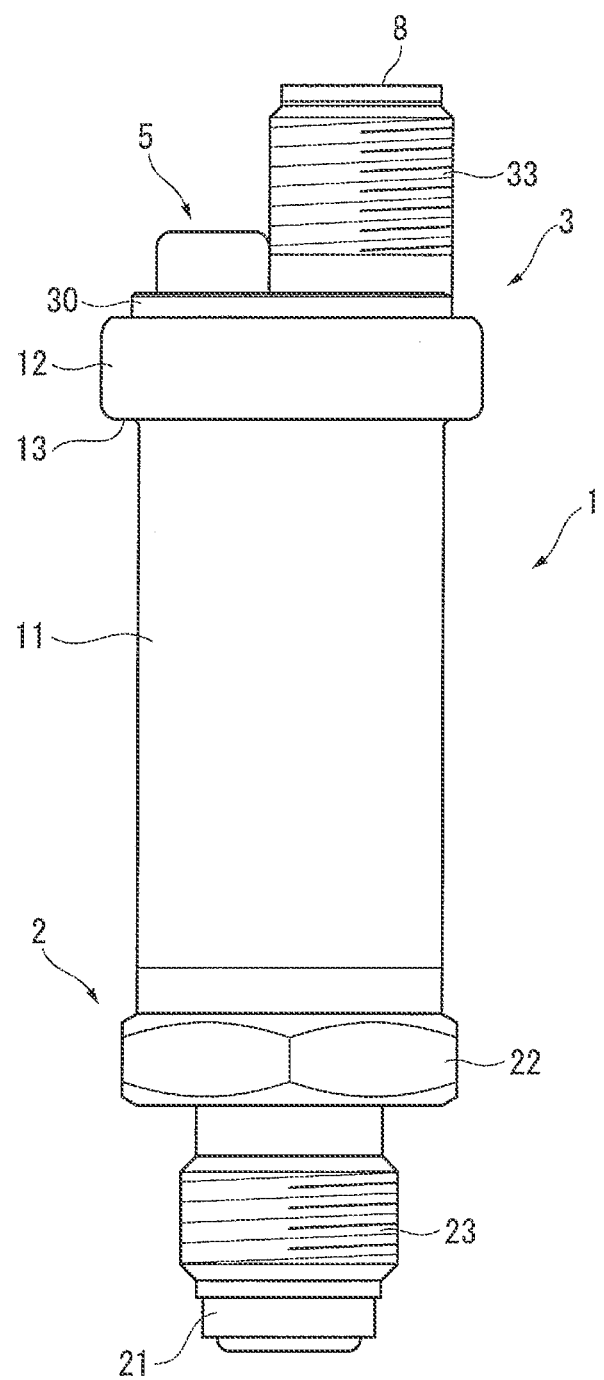
FIG. 2 is another side elevational view showing the physical quantity measuring device as seen in a direction different from that of FIG. 1.
Figure 3:
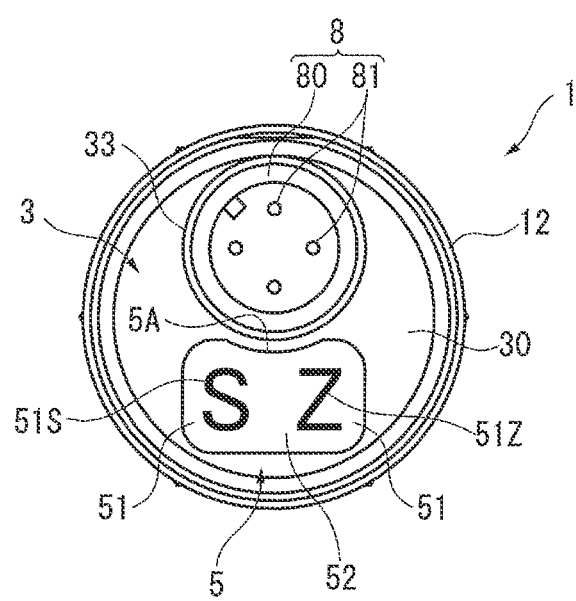
FIG. 3 is a plan view showing the physical quantity measuring device.
Figure 4:
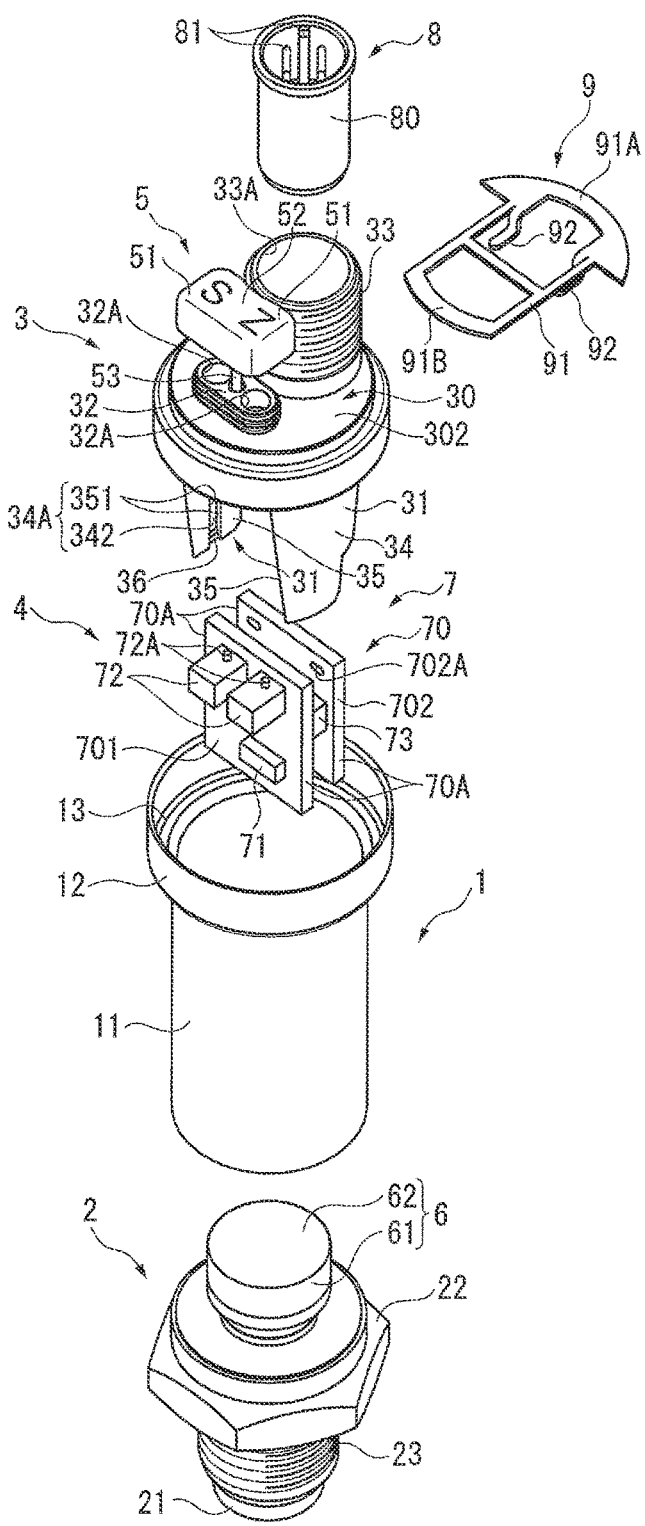
FIG. 4 is an exploded perspective view showing the physical quantity measuring device.
Figure 5:
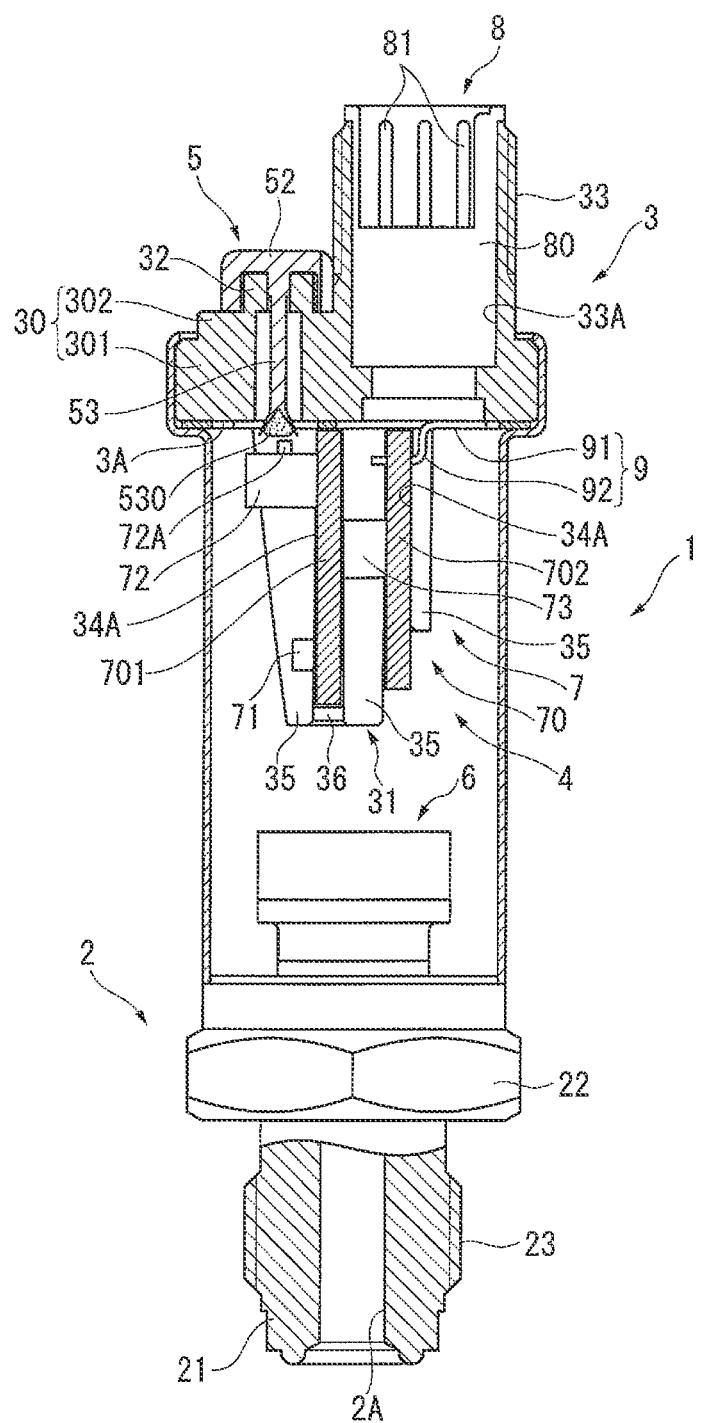
FIG. 5 is a sectional view showing the physical quantity measuring device.

FIGS. 1 and 2 show an exterior of the physical quantity measuring device. FIG. 3 is a plan view of the physical quantity measuring device. FIG. 4 schematically shows an arrangement of the physical quantity measuring device. FIG. 5 is a sectional view of the physical quantity measuring device.

As shown in FIGS. 1 to 5, the physical quantity measuring device includes: a cylindrical case 1; a joint 2 provided to a first open end of the case 1; a cover member 3 provided to a second open end of the case 1; a measuring mechanism 4 provided inside the case 1; and a cap member 5 removably attachable to the cover member 3.

The case 1, which is machined from a metal cylindrical member, includes a body 11 and a fitting ring 12 integrally provided to a side of the body 11 corresponding to the second open end of the case 1, the fitting ring 12 being fitted on the cover member 3.

The fitting ring 12 has a diameter larger than that of the body 11. A stepped portion 13 is defined between the body 11 and the fitting ring 12 along a case-diameter direction.

The joint 2 is a metal member including: a shaft 21 provided with an introduction hole 2A through which a fluid to be measured is introduced; and a flange 22 radially extending from the center of the shaft 21.

The shaft 21 has a first end provided with a thread 23 to be screwed into a mount (not shown).

As shown in FIGS. 4 and 5, the measuring mechanism 4 includes: a detector 6 provided to a second end of the shaft 21 of the joint 2 to detect a pressure of the fluid to be measured; a circuit board 7 disposed at a distance from the detector 6; a signal transmitting member 8 connected to the circuit board 7; and a holder 9 attached to the cover member 3 to hold the circuit board 7.

The detector 6 is a metal member including: a cylindrical portion 61 bonded to the second end of the shaft 21; and a diaphragm 62 integrally provided to an end of the cylindrical portion 61 opposite with the second end of the shaft 21.

The diaphragm 62 includes a strain gauge (not shown) for detecting the pressure of the fluid to be measured introduced through the introduction hole 2A.

The circuit board 7 includes: a substrate body 70; and an electronic circuit unit 71 and an electronic adjusting unit 72 that are provided on the substrate body 70.

The substrate body 70 is a rectangular plate member in a plan view and has a front surface on which a wiring pattern (not shown) is formed.

In the first exemplary embodiment, the substrate body 70 includes: parallel first substrate 701 and second substrate 702; and a connecting body 73 that connects the first substrate 701 and the second substrate 702.

The electronic circuit unit 71, which receives a detection signal from the detector 6, is disposed on the front surface of the substrate body 70. It should be noted that rear one of the substrates of the substrate body 70 is similarly provided with an electronic circuit unit (not shown). The strain gauge of the detector 6 and the electronic circuit unit 71 are electrically connected to each other through a wiring or the like (not shown).

The electronic adjusting unit 72, which adjusts the electronic circuit unit 71, includes two electronic adjusting units disposed on the front surface of the substrate body 70. In the first exemplary embodiment, the left one of the electronic adjusting units 72 shown in FIG. 4 is intended for span adjustment (adjustment of output voltage) and the right one of the electronic adjusting units 72 shown in FIG. 4 is intended for zero adjustment.

The electronic adjusting units 72 are each provided with an operable portion 72A functioning as a trimmer near the cover member 3. The operable portion 72A is turned or pressed with a tool such as driver (not shown) to perform the adjustment.

The signal transmitting member 8 includes a cylindrical member 80 and a plurality of terminals 81 provided to the cylindrical member 80. The terminals 81 are electrically connected to the circuit board 7 through a wiring or the like (not shown).

As shown in FIGS. 4 and 5, the cover member 3, which is made of a synthetic resin, includes a cover body 30, a supporting portion 31 provided to the cover body 30 and projecting toward the inside of the case 1; and a step 32 and a cylindrical portion 33 provided to the cover body 30 at a side opposite with the supporting portion 31.

The cover body 30 includes: a large-diameter portion 301 having a bottom surface 3A facing the inside of the case 1; and a small-diameter portion 302 integral with a surface of the large-diameter portion 301 opposite with the bottom surface 3A.

The supporting portion 31 is an elongated member projecting from the bottom surface 3A of the large-diameter portion 301 toward the inside of the case 1. It should be noted that the bottom surface 3A of the cover body 30 may be provided with a guide groove G so that the holder 9 can be attached to the cover body 30 without interference of the wiring or the like (not shown) connected to the terminals 81 (see imaginary lines in FIGS. 6 and 7).

The step 32 projects from an outer surface of the cover body 30 opposite with the bottom surface 3A. The step 32 is in an oblong shape in a plan view and has operation holes 32A arranged side by side (on right and left sides as shown in FIG. 4).

The left one of the operation holes 32A is provided so that the operable portion 72A of the electronic adjusting unit 72 for span adjustment can be operated with a tool such as a driver (not shown). The right one of the operation holes 32A is provided so that the operable portion 72A of the electronic adjusting unit 72 for zero adjustment can be operated with a tool such as a driver (not shown).

The operable portions 72A are disposed right under the operation holes 32A so that the operable portions 72A can be easily operated with a tool such as a driver.

The cylindrical portion 33 is provided adjacent to the step 32 and has an inner circumferential surface defining a mount hole 33A in which the cylindrical member 80 is to be mounted. The cylindrical portion 33 has an outer circumferential surface provided with a male thread.

With reference to FIGS. 6 to 9, description will be made on an arrangement for the circuit board 7 to be supported on the cover member 3.

Figure 6:
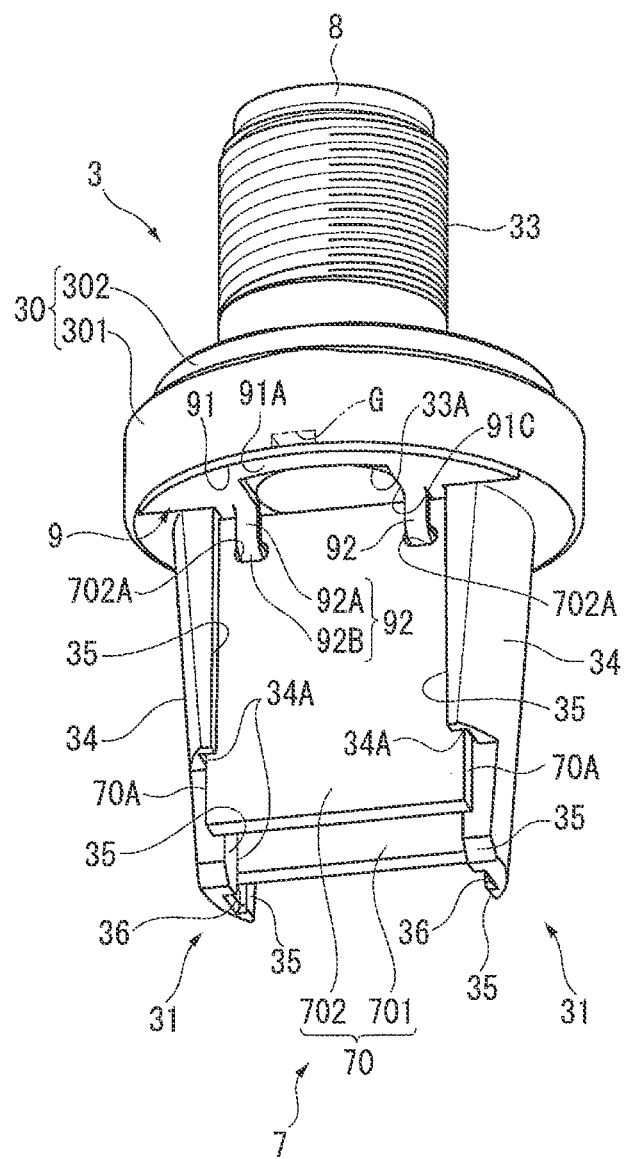
FIG. 6 is a perspective view showing a circuit board supported by a cover member.
Figure 7:
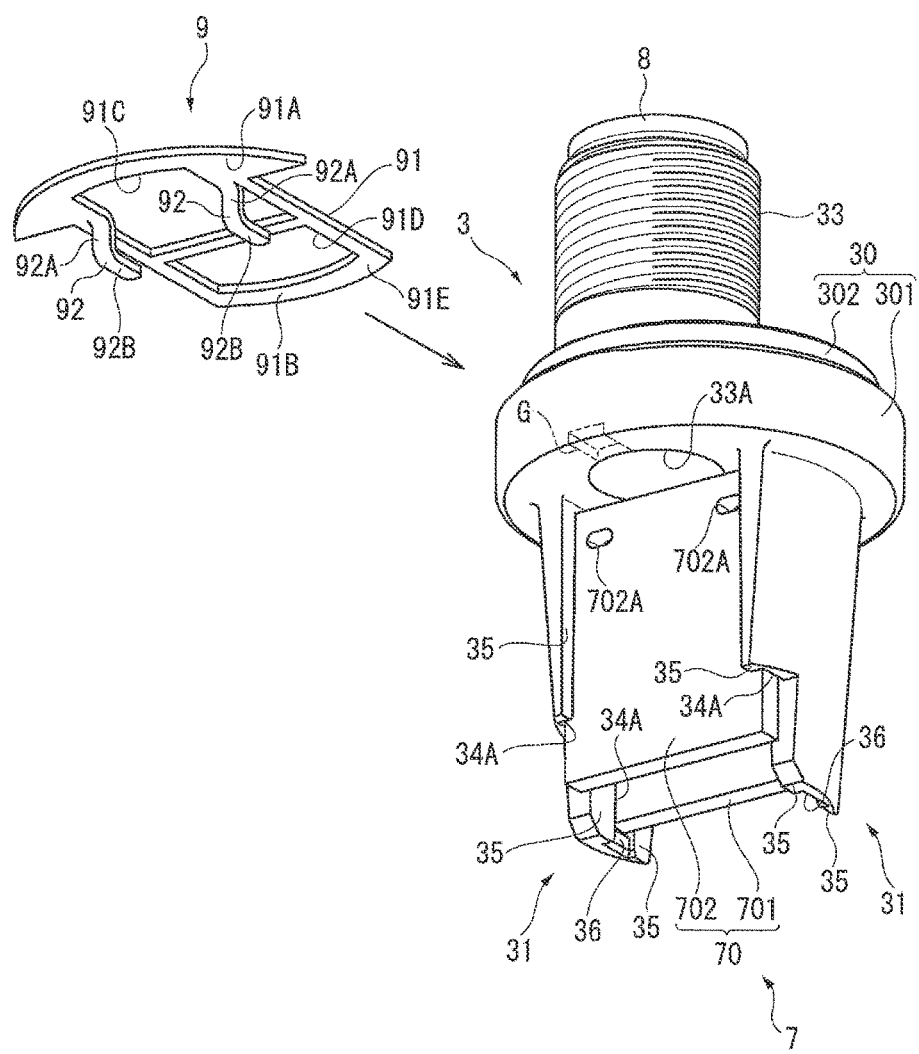
FIG. 7 is a perspective view showing a holder to be attached to the cover member.
Figure 8:
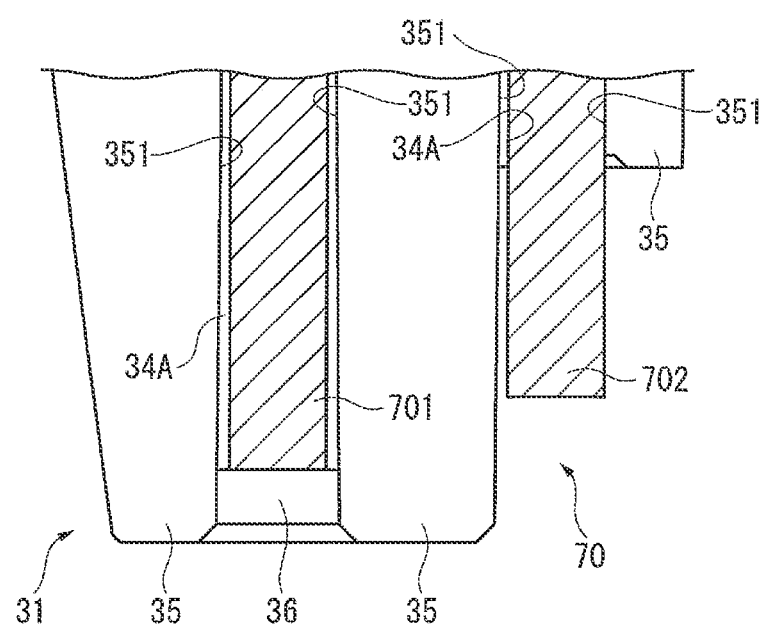
FIG. 8 is a side view showing a supporting portion.

FIG. 6 shows an overall arrangement for the circuit board 7 to be supported on the cover member 3. FIG. 7 shows the holder 9 to be attached to the cover member 3. FIG. 8 shows a relevant part of the supporting portion 31.

As shown in FIGS. 4 to 7, the supporting portion 31 includes supporting portions disposed at two opposite positions on an outer periphery of the bottom surface 3A of the large-diameter portion 301.

The supporting portions 31 each include a base 34 and pair(s) of support projections 35 provided to an inner surface of the base 34. The respective inner surfaces of the supporting portions 31 are opposed to each other in parallel.

The support projections 35, which are configured to support the first substrate 701 and the second substrate 702, include three support projections extending along a longitudinal direction of the base 34 (a projecting direction of the supporting portions). Specifically, the support projections 35 include a center support projection disposed at the center of the base 34, a first side support projection disposed at a first edge of the base 34 and a second side support projection disposed at a second edge of the base 34 opposite with the first edge, the center support projection and the first side support projection being paired to support the first substrate 701, the center support projection and the second side support projection being paired to support the second substrate 702.

A surface of the center support projection 35 and a surface of the first side support projection 35 (i.e., a pair of first support surfaces 351) respectively face peripheries of two opposite flat surfaces of the first substrate 701, the first support surfaces 351 having edges connected by an inner surface of the base 34 (i.e., a second support surface 342) that faces a side surface 70A of the first substrate 701.

Similarly, a surface of the center support projection 35 and a surface of the second side support projection 35 (i.e., another pair of first support surfaces 351) respectively face peripheries of two opposite flat surfaces of the second substrate 702, the first support surfaces 351 having edges connected by an inner surface of the base 34 (another second support surface 342) that faces a side surface 70A of the second substrate 702.

In the first exemplary embodiment, the pair of first support surfaces 351 and the second support surface 342 in combination define a support groove 34A that supports the first substrate 701.

A claw 36 is provided between the center support projection 35 and the first side support projection 35 to prevent detachment of the first substrate 701. It should be noted that although it seems that only one of the pairs of supporting portions 31 is provided with the claw 36 in the figures, the other supporting portion 31 is also provided with another claw 36 having the same structure.

The claw 36 is provided to a distal end of the base 34 in a projecting manner.

It should be noted that a line connecting the respective centers of the opposite supporting portions 31 coplanar with the bottom surface 3A is offset from an imaginary line passing through the circle center of the bottom surface 3A. Further, an outer surface of the base 34 is in an arc along an inner circumferential surface of the case 1, and is provided with a slope so that the base 34 is tapered from the bottom surface 3A toward the distal end thereof. The second side support projection 35 for supporting the second substrate 702 is thus longitudinally shorter than the first support projection 35 for supporting the first substrate 701, so that an end of the second substrate 702 is exposed. Therefore, the claw 36 is not provided between the center support projection 35 and the second side support projection 35. It should be noted that the slope provided to the outer surface of the base 34 to taper the base 34 from the bottom surface 3A toward the distal end thereof is necessary in molding each of the supporting portions 31 from a synthetic resin and, further, contributes to easy insertion of the cover body 30 into the case 1.

Figure 9:
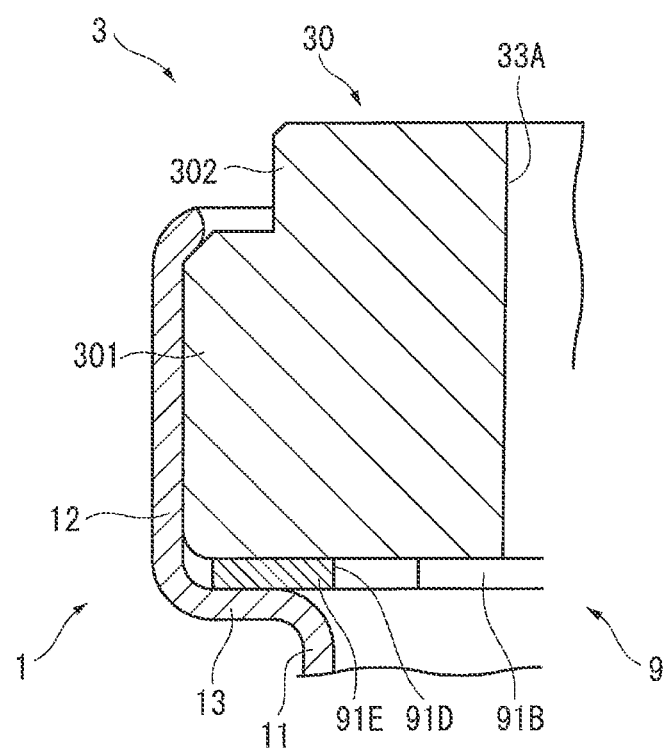
FIG. 9 is a sectional view showing the holder attached to the cover member.

The holder 9 will be described with reference to FIGS. 4 to 7 and 9. FIG. 9 shows the holder 9 attached to the cover member 3.

As shown in FIGS. 4 to 7 and 9, the holder 9 is a metal member for holding the circuit board 7 with a flat surface of the circuit board 7 being perpendicular to the bottom surface 3A.

The holder 9 includes a flat portion 91 facing the bottom surface 3A of the cover member 3 and an engagement piece 92 provided to the flat portion 91 to be engaged with the second substrate 702.

The flat portion 91 includes a first plate 91A and a second plate 91B integrally provided to the first plate 91A.

The first plate 91A, which is to be held between the stepped portion 13 of the case 1 and the bottom surface 3A of the cover member 3, has an outline in conformity with an inner circumferential surface of the fitting ring 12.

The first plate 91A has an arc outer surface and a linear portion opposite with the outer surface, the linear portion being brought into contact with side surfaces of the supporting portions 31. When the first plate 91A is brought into contact with the side surfaces of the supporting portions 31, the holder 9 is positioned relative to the cover member 3 (see FIGS. 6 and 7).

The second plate 91B is inserted between the bottom surface 3A of the cover member 3 and the first substrate 701 and the second substrate 702 at a position between the pair of supporting portions 31 (see FIG. 7).

The second plate 91B includes two windows 91C, 91D and an arc end 91E opposite with the first plate 91A.

The window 91C serves as a space for inserting the wiring or the like for electrically connecting the terminals 81 and the circuit board 7. The window 91D serves as a space for preventing the holder 9 from interfering with a tool such as a driver inserted through one of the operation holes 32A to operate the operable portion 72A.

As shown in FIG. 9, the end 91E of the second plate 91B, which is to be held between the stepped portion 13 of the case 1 and the bottom surface 3A of the cover member 3, has an outline in conformity with the inner circumferential surface of the fitting ring 12.

The fitting ring 12 of the case 1 is crimped to fasten the cover body 30 and the flat portion 91 of the holder 9 to each other. In the first exemplary embodiment, the fitting ring 12 is continuously crimped along the entire circumference thereof (i.e., full-circumference crimping), but may alternatively be crimped at predetermined spots (i.e., spot crimping). It should be noted that the respective outlines of the first plate 91A and the end 91E of the second plate 91B may be, for instance, in a trapezoidal shape instead of being in an arc as long as the first plate 91A and the end 91E of the second plate 91B are held between the stepped portion 13 of the case 1 and the bottom surface 3A of the cover member 3.

As shown in FIGS. 4 to 7, the engagement piece 92 includes a rising piece 92A integral with the first plate 91A and an engagement claw 92B integral with the rising piece 92A and engageable with an engagement hole 702A provided to the second substrate 702. The engagement hole 702A and the engagement claw 92B are fixed by soldering (not shown).

In the first exemplary embodiment, the engagement hole 702A includes two right and left engagement holes provided to the second substrate 702 at positions near the bottom surface 3A of the cover member 3 (an upper end in FIGS. 5 and 6). The engagement piece 92 also includes two engagement pieces (two rising pieces 92A) in accordance with the number of the engagement holes 702A.

Figure 10:
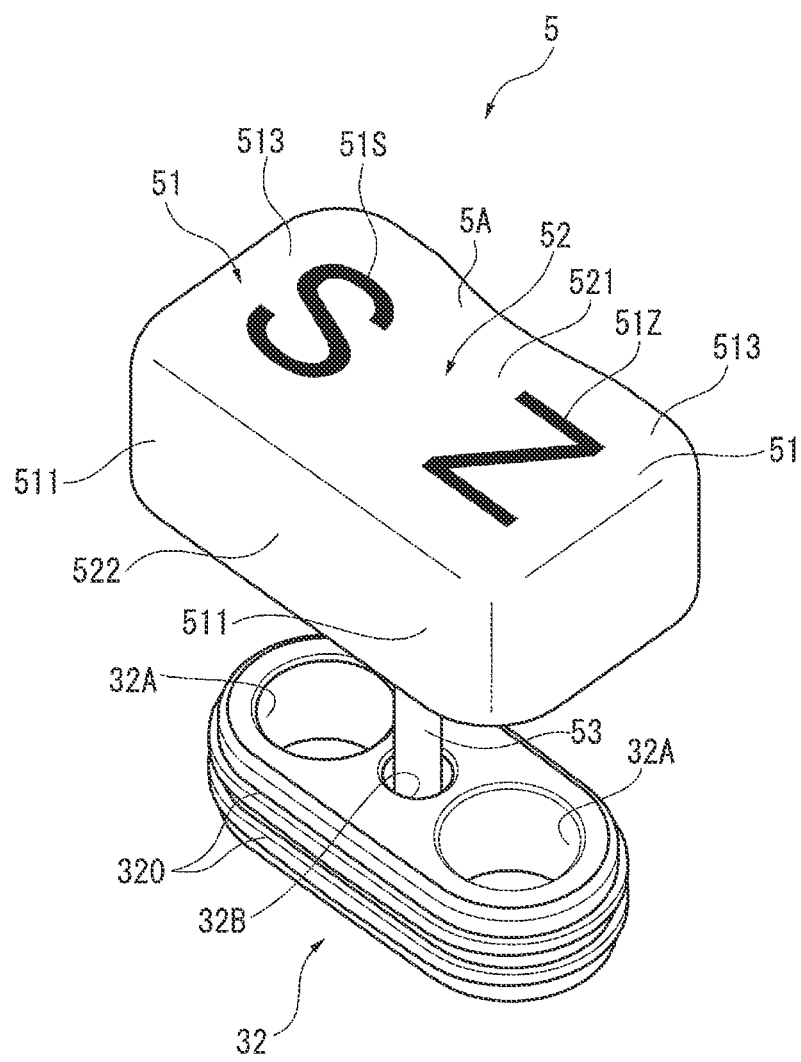
FIG. 10 is a perspective view showing a cap member according to the first exemplary embodiment.
Figure 11:
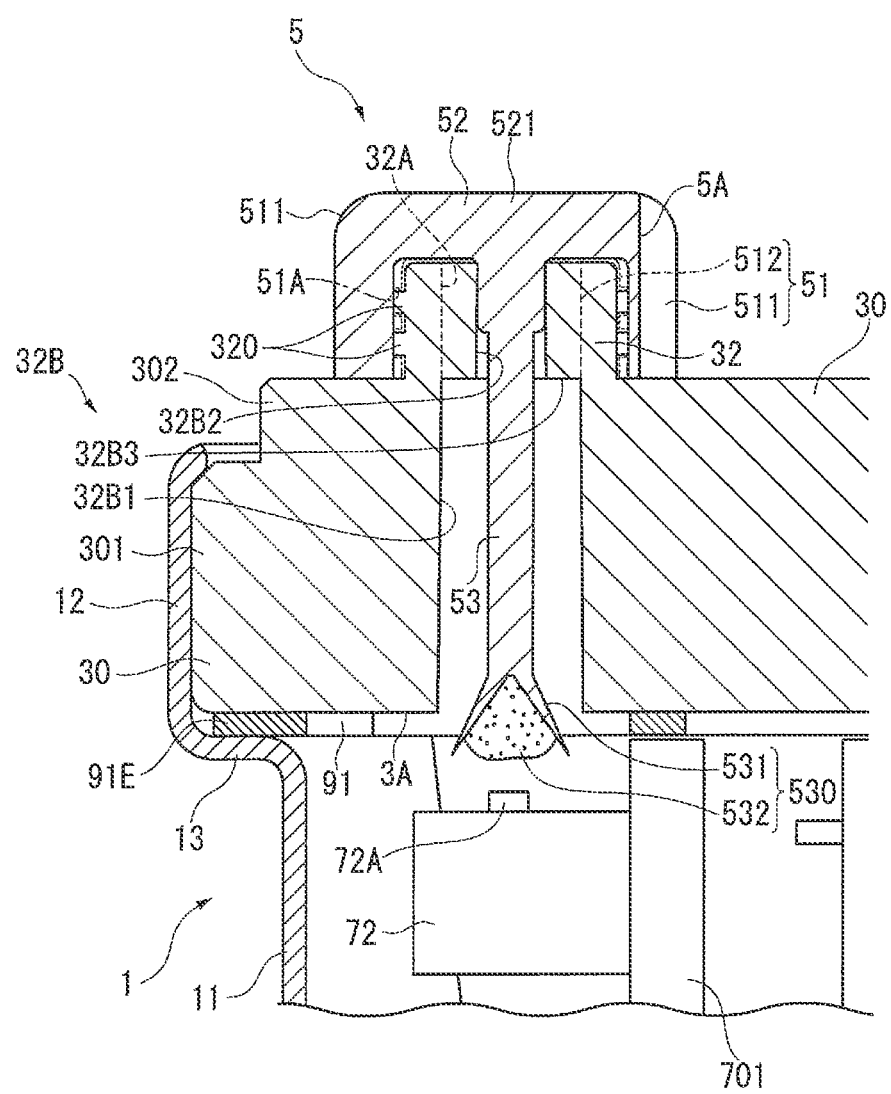
FIG. 11 is a sectional view showing the cap member.
Figure 12:
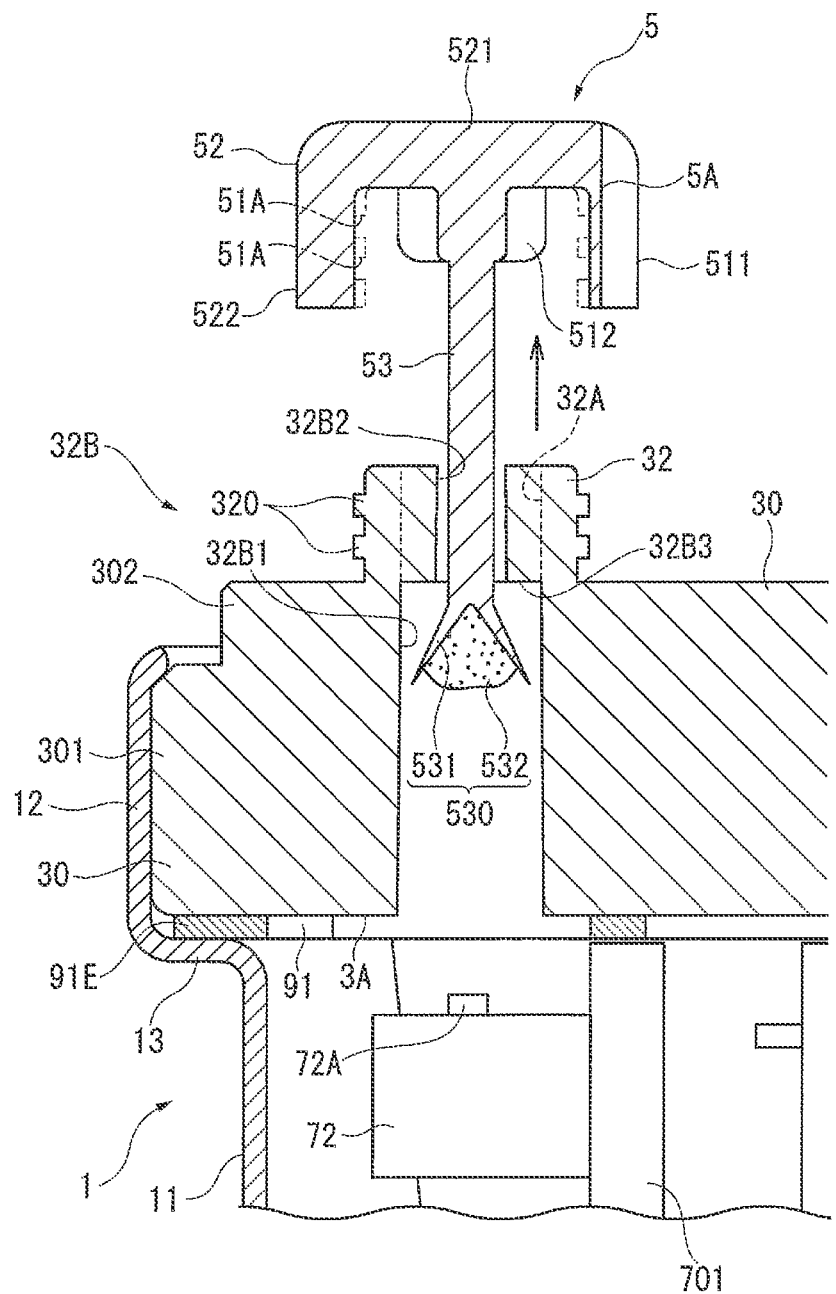
FIG. 12 is a sectional view showing the cap member to be removed.

An arrangement of the cap member 5 will be described with reference to FIGS. 3 to 5 and 10 to 12. FIGS. 10 to 12 show a detailed arrangement of the cap member 5.

As shown in FIGS. 3 to 5 and 10 to 12, the cap member 5 includes: two cap bodies 51 removably attachable to the two operation holes 32A provided to the step 32; and a uniting portion 52 uniting the cap bodies 51 to each other. The uniting portion 52 is connected to a first end of an elastic linear loss-preventing member 53 made of a synthetic resin. A second end of the linear loss-preventing member 53 is engageable with the cover body 30.

The cap member 5 has an outer wall that faces the cylindrical portion 33. The outer wall is provided with a recess 5A shaped in conformity with an outer circumferential shape of the cylindrical portion 33.

In the first exemplary embodiment, the two cap bodies 51 and the uniting portion 52 of the cap member 5 are integrally formed from a rubber or a synthetic resin.

The cap bodies 51 each include: an outer wall 511 having an inner circumferential surface engageable with an outer circumferential surface of the step 32; an inner wall 512 having an outer circumferential surface engageable with an inner circumferential surface of the operation hole 32A; and a top plate 513 connected to a base edge of the outer wall 511 and a base edge of the inner wall 512.

The outer circumferential surface of the step 32 is provided with a plurality of circumferential lugs 320. The outer wall 511 has an inner circumferential surface in contact with edges of the lugs 320. When the edges of the lugs 320 are in contact with the inner circumferential surface of the outer wall 511, waterproofness is improved. It should be noted that the inner circumferential surface of the outer wall 511 may be provided with a circumferential groove 51A engageable with the lugs 320 in the first exemplary embodiment (see imaginary lines in FIGS. 11 and 12).

The inner wall 512 is in pressure contact with the operation holes 32A over a predetermined length.

The top plate 513 is provided with identification signs 51S, 51Z for identifying the operable portions 72A. In the first exemplary embodiment, the left one of the operation holes 32A in the figures is provided for operating the operable portion 72A of the electronic adjusting unit 72 for span adjustment, so that the a mark "S" is printed as the identification sign 51S. The right one of the operation holes 32A is provided for operating the operable portion 72A of the electronic adjusting unit 72 for zero adjustment, so that a mark "Z" is printed as the identification sign 51Z (see FIGS. 3, 4 and 10). It should be noted that the identification signs 51S, 51Z are different marks in the first exemplary embodiment, but may alternatively be, for instance, different letters and/or have different colors.

The uniting portion 52 includes a uniting plate 521 coplanar and integral with the top plate 513 and a uniting wall 522 coplanar and integral with the outer wall 511.

The uniting plate 521 is connected to the first end of the linear loss-preventing member 53.

The linear loss-preventing member 53 is an elastic string body made of a synthetic resin and the second end of the linear loss-preventing member 53 is inserted into a hole portion 32B provided to the step 32 between the two operation holes 32A.

The hole portion 32B includes: a large-diameter part 32B1 provided to the cover body 30 and opened in the bottom surface 3A; a small-diameter part 32B2 provided to the step 32 and opened in a flat surface of the step 32; and a stepped portion 32B3 defined between the large-diameter part 32B1 and the small-diameter part 32B2. The linear loss-preventing member 53 is engageable with the stepped portion 32B3 of the hole portion 32B.

The linear loss-preventing member 53 has a length sufficient to avoid interference of the cap member 5 with a tool such as a driver inserted into one of the operation holes 32A when the cap member 5 is removed and a retaining portion 530 is engaged with the stepped portion 32B3 of the hole portion 32B. The retaining portion 530 is thus spaced from the hole portion 32B when the cap member 5 is attached on the step 32.

The retaining portion 530 includes a split portion 531 provided to the second end of the linear loss-preventing member 53 and an adhesive 532 provided to a gap between split ends of the split portion 531. The adhesive 532 may be an instant adhesive, a molding compound or the like.

The adhesive 532 serves to keep a dimension between the split ends of the split portion 531 wider than an inner diameter of the small-diameter part 32B2 (see FIGS. 11 and 12).

It should be noted that the shape of the split portion 531 may be changed as desired in the first exemplary embodiment, and thus may be in a V-shape, U-shape or rectangular shape (in a cross section) as shown in FIGS. 11 and 12. Further, as shown in FIGS. 11 and 12, the second end of the linear loss-preventing member 53 may be split into two parts by providing one slit, into three parts by providing three slits, or into four parts by providing two intersecting slits.

Next, description will be made on a method of manufacturing the physical quantity measuring device according to the first exemplary embodiment.

Detector Attaching Process

The detector 6 is, for instance, welded to the shaft 21 of the joint 2 and the first open end of the case 1 is, for instance, welded to the joint 2.

Cover Member Assembling Process

The cylindrical member 80 of the signal transmitting member 8 is mounted in the cylindrical portion 33 of the cover member 3, and the cap member 5 is attached to the cover member 3.

In order to attach the cap member 5 to the cover member 3, the linear loss-preventing member 53 is first inserted into the hole portion 32B until the second end of the linear loss-preventing member 53 is exposed from the bottom-side open end of the hole portion 32B of the cover member 3. The uniting portion 52 and the linear loss-preventing member 53 of the cap member 5 are integrally formed in advance. It should be noted that the uniting portion 52 and the first end of the linear loss-preventing member 53 of the cap member 5 may alternatively be connected to each other with an adhesive or the like in the first exemplary embodiment.

The retaining portion 530 is then provided on the second end of the linear loss-preventing member 53.

In order to provide the retaining portion 530, after or before the linear loss-preventing member 53 is inserted into the hole portion 32B, a slit is provided to the second end of the linear loss-preventing member 53. The slit ends of the second end of the linear loss-preventing member 53 are then separated to form the split portion 531 and the adhesive 532 is applied to the split portion 531. When the adhesive 532 is cured, the split portion 531 is kept split. In this manner, the retaining portion 530 is provided on the second end of the linear loss-preventing member 53.

In the cover member assembling process, the cap bodies 51 of the cap member 5 are attached to the two operation holes 32A of the step 32. In the above state, the retaining portion 530 is spaced from the hole portion 32B (see FIG. 11).

Process for Attaching Circuit Board in Case

Next, the substrate body 70 including the electronic circuit unit 71 and the electronic adjusting units 72 is attached to the cover member 3. Specifically, the first substrate 701 and the second substrate 702 of the substrate body 70 are pushed into the cover body 30 along the support grooves 34A defined by the support projections 35 of the cover member 3. Before pushing the first substrate 701, the claws 36 opposed to each other are pushed away from each other. When the first substrate 701 is pushed deepest into the cover body 30, the claws 36 approach each other with the assistance of an elasticity of the supporting portions 31 to which the claws 36 are provided, so that the end of the first substrate 701 is held by the claws 36.

When the first substrate 701 is held by the claws 36, a gap is defined between the substrate body 70 and the bottom surface 3A of the cover body 30. The holder 9 is then inserted into the gap (see FIG. 7) until the first plate 91A is brought into contact with the side surfaces of the supporting portions 31 and the engagement pieces 92 are inserted into the engagement holes 702A to engage the second substrate 702. The engagement pieces 92 and the engagement holes 702A are then soldered to each other.

The circuit board 7 thus held relative to the cover member 3 is then disposed inside the case 1. In the first exemplary embodiment, the cover member 3, the circuit board 7 and the holder 9 are shaped in conformity with one another to be a unit.

It should be noted that the detector 6 and the circuit board 7 as well as the circuit board 7 and the signal transmitting member 8 are connected through a wiring at an appropriate timing, for instance, prior to the detector attaching process.

Bonding Process

The cover body 30 of the cover member 3 is bonded to the second open end of the case 1. Specifically, the cover member 3 with the circuit board 7 supported thereon is fitted in the fitting ring 12 of the case 1. The holder 9 is thus held between the stepped portion 13 of the case 1 and the cover body 30, so that the circuit board 7 engaged with the holder 9 is immobilized in the case 1. Simultaneously, the holder 9 is electrically connected to the case 1.

Subsequently, an edge of the fitting ring 12 is crimped to fix the cover body 30 and the flat portion 91 of the holder 9 to each other.

Immediately after the thus-manufactured physical quantity measuring device is attached to the mount or after a predetermined operation of the thus-manufactured physical quantity measuring device is performed, the electronic adjusting unit(s) 72 may be adjusted.

In order to adjust the electronic adjusting unit(s) 72, the cap member 5 is held and pulled. The cap bodies 51 are thus removed from the operation holes 32A so that the operation holes 32A are uncovered. Even when the cap member 5 is pulled with a large force, the linear loss-preventing member 53 is prevented from being completely pulled out with the assistance of the retaining portion 530 provided on the second end of the linear loss-preventing member 53, the retaining portion 530 being engaged with the stepped portion 32B3 of the hole portion 32B of the cover body 30. It should be noted that the linear loss-preventing member 53 has the predetermined length, so that the electronic adjusting unit(s) 72 can be adjusted without interference of the cap bodies 51.

After the two operation holes 32A are uncovered, a tool such as a driver is inserted into one of the operation hole 32A corresponding to one of the electronic adjusting units 72 to be adjusted, and the operable portion 72A is operated with the tool.

The one of the electronic adjusting units 72 to be adjusted can be identified with reference to the identification signs 51S, 51Z printed on the cap bodies 51.

With the uniting portion 52 uniting one of the cap bodies 51 to the other cap body 51, both cap bodies 51 are not separated from each other irrespective of whether or not the cap bodies 51 are removed.

After the completion of adjustment of the electronic adjusting unit(s) 72, the uncovered operation holes 32A are covered by the cap bodies 51.

The first exemplary embodiment as described above provides the following advantageous effects.

(1) The circuit board 7 including the electronic circuit unit 71 and the electronic adjusting units 72 is disposed in the case 1. The signal transmitting member 8 connected to the circuit board 7 is mounted in the mount hole 33A of the cover member 3. The cover member 3 is provided with the operation holes 32A corresponding to the plurality of operable portions 72A of the electronic adjusting units 72. The cap member 5 is attached to the cover member 3 to cover the operation holes 32A. The operation holes 32A for adjusting the electronic adjusting units 72 are easily covered/uncovered by the cap member 5 with the simple arrangement including the plurality of cap bodies 51 and the uniting portion 52 uniting the cap bodies 51. The operation holes 32A are independent of the mount hole 33A where the signal transmitting member 8 is mounted, so that the electronic adjusting units 72 can be adjusted irrespective of whether or not the signal transmitting member 8 mounted in the mount hole 33A is connected to any other connection member.

(2) The linear loss-preventing member 53 with elasticity has the first end, for instance, integral with or connected to the uniting portion 52 and the second end engageable with the stepped portion 32B3 of the hole portion 32B of the cover member 3. With the above arrangement, the cap member 5 is undetachable from the cover member 3, so that the operation holes 32A can be prevented from being inadvertently left uncovered by the cap member 5. Further, the linear loss-preventing member 53 exhibits elasticity and the cap member 5 can be laid at a position remote from the operation holes 32A during adjustment of the electronic adjusting unit(s) 72, thereby facilitating the adjustment of the electronic adjusting unit(s) 72.

(3) The step 32 projecting from the cover body 30 is provided with the operation holes 32A. Further, the cap bodies 51 have the inner walls 512 engageable with the inner circumferential surfaces of the operation holes 32A and the outer walls 511 engageable with the outer circumferential surface of the step 32. With the above arrangement, water is reliably prevented from entering the case 1 through the operation holes 32A.

(4) The linear loss-preventing member 53, which is inserted into the hole portion 32B provided to the step 32 at a position between the operation holes 32A arranged side by side, has the first end, for instance, integral with or connected to the uniting plate 521 disposed at the center of the cap member 5. A space between the operation holes 32A can thus be efficiently used as a space for inserting the linear loss-preventing member 53. Consequently, the device size can be reduced.

(5) The linear loss-preventing member 53 has the second end provided with the retaining portion 530, so that the cap bodies 51 are reliably prevented from coming out of the cover member 3.

(6) The retaining portion 530 includes the split portion 531 formed by splitting the second end of the linear loss-preventing member 53 and the adhesive 532 provided to a gap between split ends of the split portion 531. The retaining portion 530 can thus be easily provided.

(7) The cylindrical portion 33 in which the signal transmitting member 8 is mounted is disposed adjacent to the step 32, and the cap member 5 is provided with the recess 5A shaped in conformity with the outer circumferential shape of the cylindrical portion 33. With the above arrangement, as long as the recess 5A is positioned in conformity with the outer circumferential shape of the cylindrical portion 33, the cap member 5 can be attached to the operation holes 32A without being laterally inverted.

(8) The top plate 513 of the cap member 5 is provided with the identification signs 51S, 51Z for identifying the operable portions 72A, so that when the cap member 5 is removed to operate one of the operable portions 72A, wrong one of the operable portions 72A can be kept from being operated.

(9) Prior to attaching the cap member 5 to the cover member 3, the linear loss-preventing member 53 is inserted until the second end of the linear loss-preventing member 53 is exposed from the bottom-side open end of the hole portion 32B, and then the retaining portion 530 is provided on the second end of the linear loss-preventing member 53. The physical quantity measuring device can thus be efficiently manufactured.

(10) The plate-shaped circuit board 7, which receives a detection signal from the detector 6, is housed in the case 1 and is held by the holder 9 with the flat substrate surface thereof intersecting with the bottom surface 3A of the cover member 3. The holder 9 is attached to the cover member 3. The cover member 3 includes the elongated supporting portions 31 projecting from the bottom surface 3A of the cover body 30 into the case 1. The supporting portions 31 each include the pair of support projections 35 that longitudinally support one of the opposite lateral side surfaces 70A of the circuit board 7. The holder 9 includes the engagement pieces 92 engageable with the second substrate 702 of the circuit board 7. With the above arrangement, it is not necessary to bond the circuit board 7 to a member of the detector 6, so that an assembly process for the physical quantity measuring device can be simplified. Further, since each of the side surfaces 70A of the circuit board 7 is longitudinally supported by the support projection 35, the circuit board 7 can be accurately positioned to the bottom surface 3A. Further, since the holder 9 is attached to the cover member 3 and the circuit board 7 is engaged with the holder 9, the circuit board 7 is immobilized to the cover member 3 and thus reliably held relative to the cover member 3.

(11) The supporting portions 31 each include the claw 36 disposed between the support projections 35 to prevent detachment of the circuit board 7 from the bottom surface 3A. The holder 9 includes the flat portion 91 facing the bottom surface 3A of the cover member 3. With the above arrangement, the claw 36 serves to prevent the circuit board 7 from falling off the support projections 35, so that displacement of the circuit board 7 relative to the cover member 3 is restrained and thus the circuit board 7 is further reliably held relative to the cover member 3.

(12) A peripheral portion of the holder 9 is held between the cover body 30 and the case 1, thereby easily and reliably attaching the holder 9 to the cover member 3.

(13) The case 1 is crimped to fix the cover body 30 to the flat portion 91 of the holder 9, thereby stably supporting the circuit board 7 to the cover member 3 and, further, simplifying the assembly process of the device.

(14) The case 1 and the holder 9 are made of metal and the cover member 3 is made of a synthetic resin, so that the circuit board 7 can be easily grounded.

(15) The substrate body 70 includes the two first substrate 701 and second substrate 702 arranged in parallel, so that electronic components required for pressure detection can be arranged not only on the first substrate 701 but also on the second substrate 702. Therefore, as compared with the case where the electronic components are arranged in a single substrate, a length of the physical quantity measuring device defined in an axial direction of the case 1 can be reduced.

(16) The engagement pieces 92 each include the engagement claw 92B engageable with one of the engagement holes 702A of the second substrate 702. The second substrate 702 can thus be easily supported by the holder 9. Further, displacement of the circuit board 7 in an in-plane direction of the flat portion 91 of the holder 9 can be prevented.

(17) Since the engagement holes 702A are provided to the second substrate 702 at positions adjacent to the bottom surface 3A, the engagement pieces 92 can be shortened, which results in reduction in the possibility of breakage or the like of the engagement piece 92.

(18) The pair of support projections 35 have surfaces facing each other (i.e., the pair of first support surfaces 351), the first support surfaces 351 facing the peripheries of the flat surfaces of the first substrate 701 or the second substrate 702. The peripheries of the first support surfaces 351 are connected by a surface (i.e., the second support surface 342) that faces one of the side surfaces 70A of the first substrate 701 or the second substrate 702. The above two support surfaces including the first support surfaces 351 and the second support surface 342 define the U-shaped support groove 34A for supporting the first substrate 701 or the second substrate 702. With the U-shaped support groove 34A, the first substrate 701 or the second substrate 702 is reliably supported in three directions.

(19) The cover member 3, the circuit board 7 and the holder 9 are shaped in conformity with one another to be a unit, which results in a reduction in the number of components and thus in a reduction in production costs.

Second Exemplary Embodiment

Next, a second exemplary embodiment according to the invention will be described with reference to FIGS. 13 to 15.

The components of the second exemplary embodiment are structurally identical to those of the first exemplary embodiment except the cover member and the cap member. In the description of the second exemplary embodiment, components identical to those of the first exemplary embodiment are attached with the like reference signs and the explanation thereof is omitted.

Figure 13:
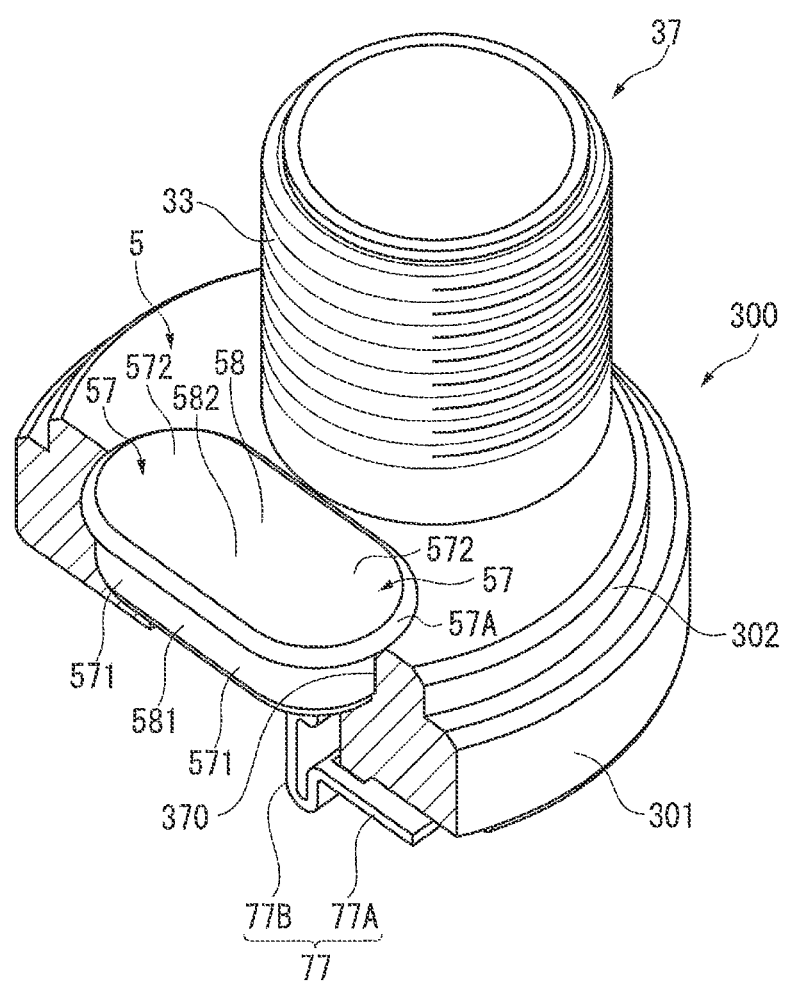
FIG. 13 is a perspective view showing that a cap member according to a second exemplary embodiment of the invention is attached to the cover member.
Figure 14:
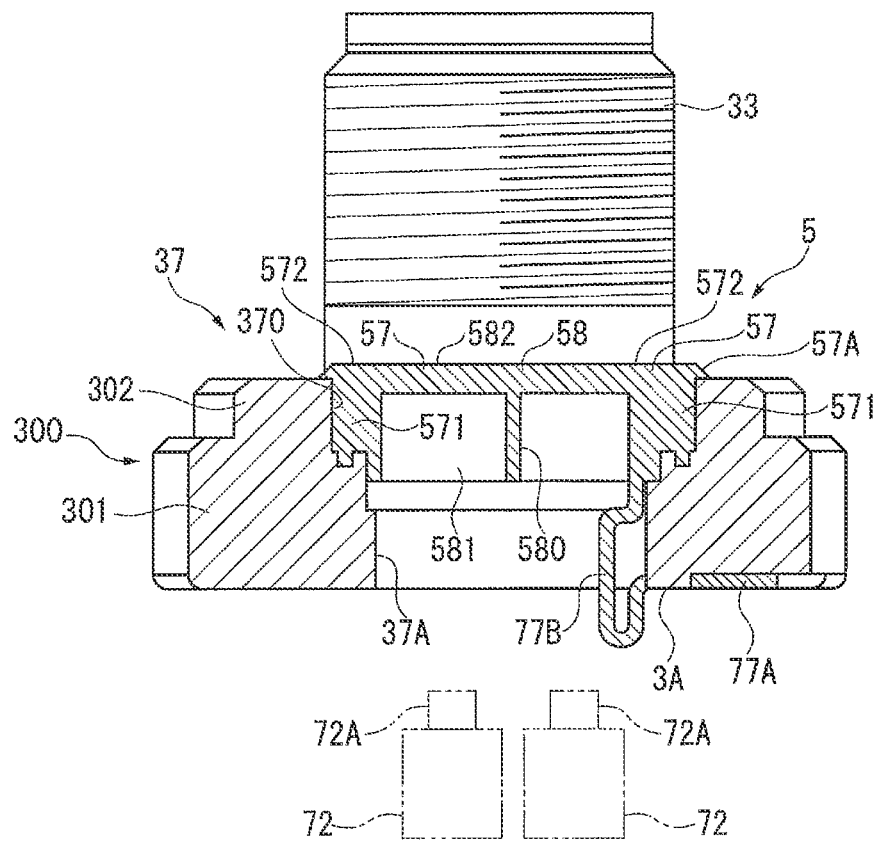
FIG. 14 is a sectional view showing the cap member attached to the cover member.
Figure 15:
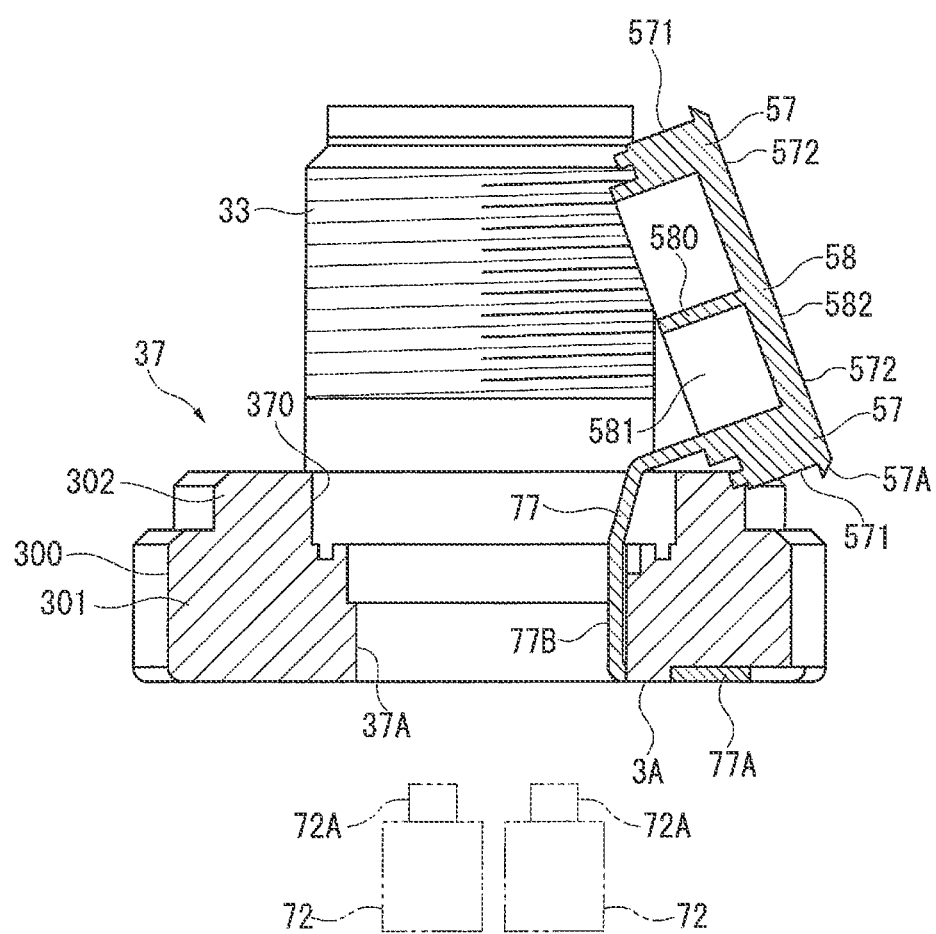
FIG. 15 is a sectional view showing the cap member removed from the cover member.

FIGS. 13 to 15 show a relevant part of the second exemplary embodiment. It should be noted that a signal transmitting member is not shown in FIGS. 13 to 15.

As shown in FIGS. 13 to 15, a cover member 37, which is to be attached to the case 1 according to the first exemplary embodiment, includes an indentation 370 having a bottom provided with an operation hole 37A.

The operation hole 37A according to the second exemplary embodiment has a large opening area equivalent to a hole provided by connecting the two operation holes 32A according to the first exemplary embodiment. The two electronic adjusting units 72 are provided in the case 1 at positions adjacent to the operation hole 37A in the same manner as in the first exemplary embodiment.

The cap member 5 includes two cap bodies 57 removably attachable to the indentation 370 at positions corresponding to the operable portions 72A of the electronic adjusting units 72 and a uniting portion 58 uniting the cap bodies 57.

The cap bodies 57 each include: an outer wall 571 having an outer surface engageable with an inner circumferential surface of the indentation 370; and a top plate 572 connected to a base edge of the outer wall 571.

The uniting portion 58 includes: a uniting plate 582 coplanar and integral with the top plate 572; and a uniting wall 581 integral with the outer wall 571, the uniting wall 581 having a base edge connected to the uniting plate 582. The uniting wall 581 has a lower surface provided with a reinforcing rib 580.

The top plate 572 and the uniting plate 582 only slightly project from an outer surface of the cover member 37 and thus are substantially coplanar with the outer surface of the cover member 37. The respective outer peripheries of the top plate 572 and the uniting plate 582 define an inclined surface 57A continuous with the outer surface of the cover member 37.

It should be noted that identification signs (not shown) for identifying the operable portions 72A are similarly provided to the top plate 572 in the second exemplary embodiment.

A distal edge of the outer wall 571 is connected to a first end of a linear loss-preventing member 77.

The linear loss-preventing member 77 is formed integrally with the cap body 57 and the uniting portion 58 by injection molding or is bonded to the cap body 57 with an adhesive or the like.

The linear loss-preventing member 77 includes: an engagement piece 77A engaged with the bottom surface 3A of the cover member 37; and a belt portion 77B integral with the engagement piece 77A and connected to the outer wall 571.

The belt portion 77B is folded in the middle thereof.

The second exemplary embodiment provides the following advantageous effects (20) to (22) in addition to the advantageous effects (1), (2), (8) and (10) to (19) of the first exemplary embodiment.

(20) The cap body 57 includes the outer wall 571 having an outer surface engageable with the inner circumferential surface of the indentation 370 of the cover member 37 and the top plate 572 connected to the base edge of the outer wall 571. The uniting portion 58 includes the uniting plate 582 integral with the top plate 572 and the uniting wall 581 having a base edge connected to the uniting plate 582. With the above arrangement, the inner circumferential surface of the indentation 370 of the cover member 37 is in close contact with the respective outer circumferential surface of the outer wall 571 and the uniting wall 581 with a high waterproof effect.

(21) The linear loss-preventing member 77 has the first end connected to the distal edge of the outer wall 571. Therefore, when the cap member 5 is removed, the operation hole 37A is widely uncovered and thus the operable portion(s) 72A can be easily operated.

(22) The respective outer peripheries of the top plate 572 and the uniting plate 582 define the inclined surface 57A continuous with the outer surface of the cover member 37, so that the cap member 5 does not noticeably project from the cover member 37. The cap member 5 attached to the cover member 37 is not visually annoying.

Third Exemplary Embodiment

Next, a third exemplary embodiment according to the invention will be described with reference to FIGS. 16 to 18.

The components of the third exemplary embodiment are structurally identical to those of the first exemplary embodiment except the cover member. In the description of the third exemplary embodiment, components identical to those of the first exemplary embodiment are attached with the like reference signs and the explanation thereof is omitted.

Figure 16:
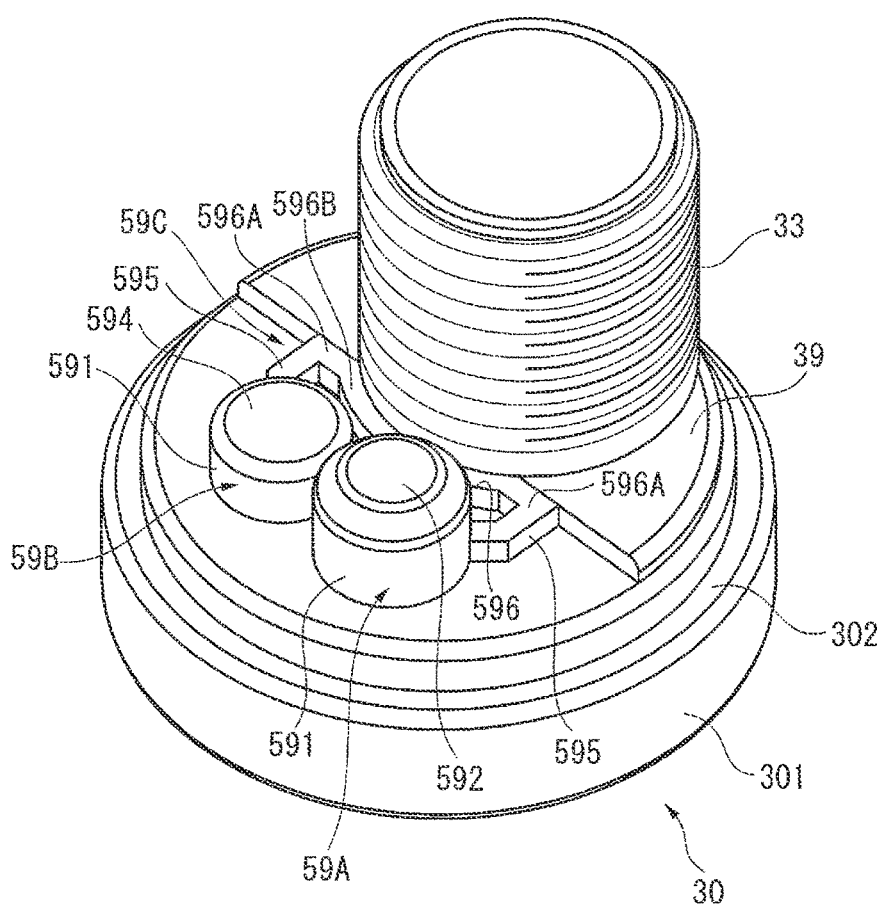
FIG. 16 is a perspective view showing that a cap member according to a third exemplary embodiment of the invention is attached to the cover member.
Figure 17:
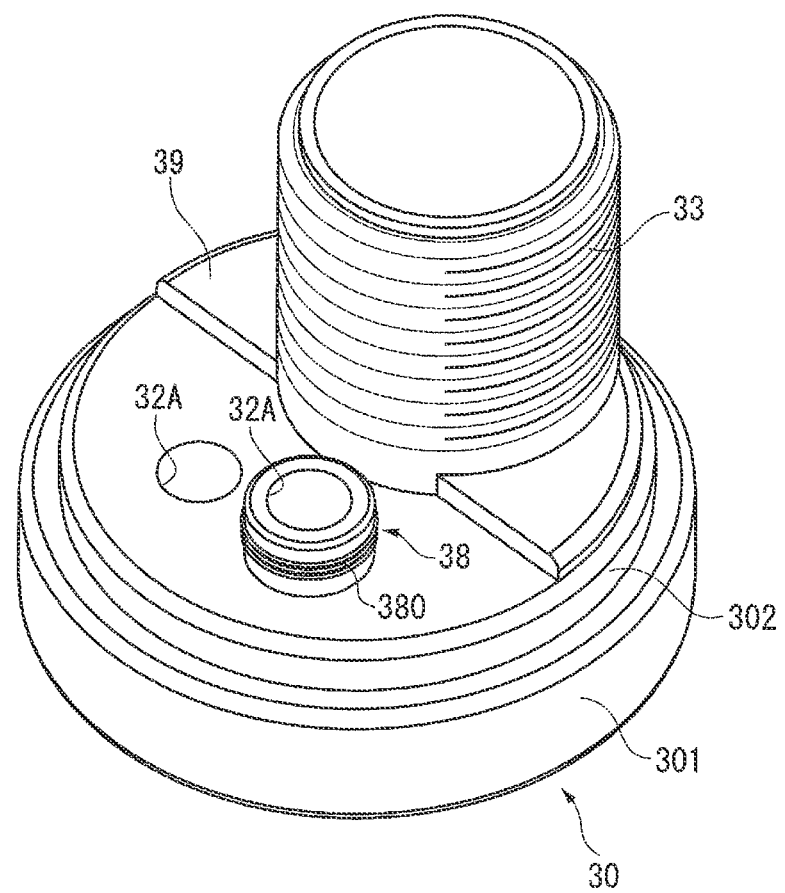
FIG. 17 is a perspective view showing the cover member from which the cap member is removed.
Figure 18:
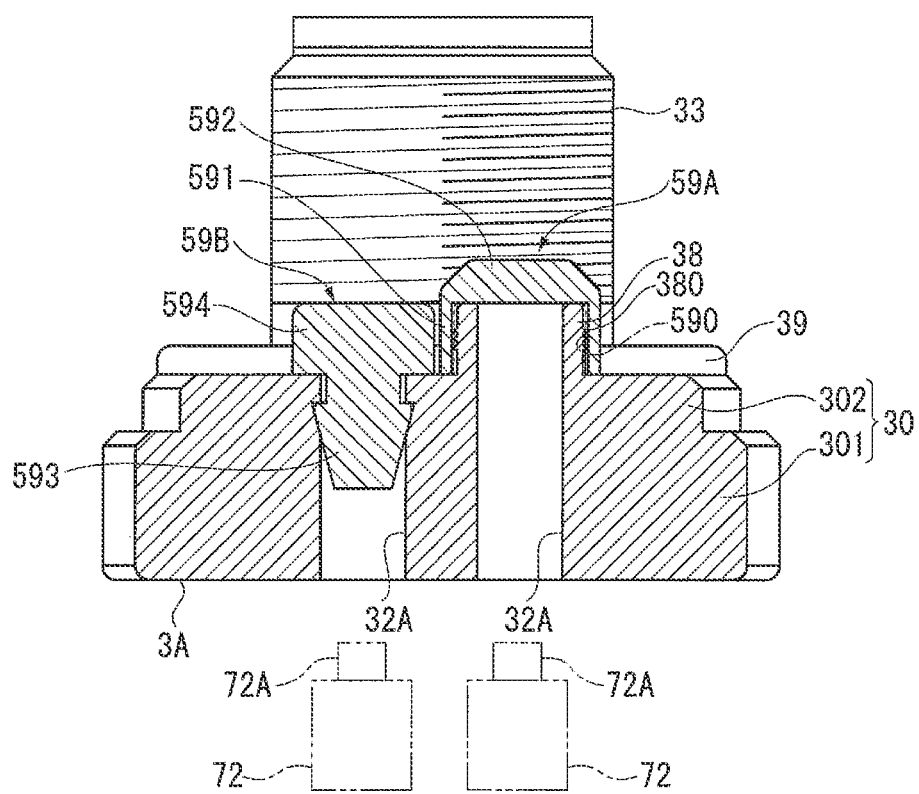
FIG. 18 is a sectional view showing the cap member attached to the cover member.

FIGS. 16 to 18 show a relevant part of the third exemplary embodiment. It should be noted that a signal transmitting member is not shown in FIGS. 16 to 18.

As shown in FIGS. 16 to 18, an outer surface of the cover body 30 opposite with the bottom surface 3A is provided with a cylindrical step 38 and a plate 39 surrounding a base end of the cylindrical portion 33.

The plate 39 has a thickness smaller than an axial dimension of the cylindrical portion 33.

A shape of the plate 39 in a plan view includes: a first portion that faces the step 38 and is linear except the center thereof; and a second portion other than the liner first portion, the second portion being in an arc in conformity with an outer periphery of the cover body 30.

In the third exemplary embodiment, one of the two operation holes 32A penetrates through the step 38 and the other operation hole 32A is provided to the cover body 30 (see FIGS. 17 and 18). The electronic adjusting unit 72 with the operable portion 72A corresponding to the operation hole 32A provided to the step 38 is an electronic component especially requiring waterproofing.

A cap body 59A is removably attachable to the operation hole 32A provided to the step 38.

The cap body 59A includes: an outer wall 591 having an inner circumferential surface engageable with the outer circumferential surface of the step 38; and a top plate 592 provided to a base edge of the outer wall 591.

The outer circumferential surface of the step 38 is provided with a plurality of circumferential lugs 380. The outer wall 591 has an inner circumferential surface in contact with edges of the lugs 380. When the edges of the lugs 380 are in contact with the inner circumferential surface of the outer wall 591, waterproofness is improved. It should be noted that the inner circumferential surface of the outer wall 591 may be provided with a circumferential groove 590 engageable with the lugs 380 in the third exemplary embodiment (see an imaginary line in FIG. 18).

A cap body 59B is removably attachable to the operation hole 32A provided to the cover body 30.

The cap bodies 59B includes: a conical portion 593 having an outer surface engageable with an inner circumferential surface of the operation hole 32A; and a top plate 594 connected to a base end of the conical portion 593. An outer circumferential edge of the conical portion 593 is in contact with the inner circumferential surface of the operation hole 32A and the top plate 594 is in contact with the cover body 30, so that waterproofness is acquired.

The top plate 594 has a height lower than that of the cap body 59A.

The cap bodies 59A, 59B are made of rubber or a synthetic resin.

In the third exemplary embodiment, identification signs (not shown) for identifying the operating portions 72A are provided to the cap bodies 59A, 59B.

The cap body 59A and the cap body 59B are connected to each other by a synthetic resin uniting portion 59C.

The uniting portion 59C is a linear synthetic resin member having a rectangular cross section for connecting the outer wall 591 of the cap body 59A to the top plate 594 of the cap body 59B, and is integrally provided by injection molding or the like or bonded with an adhesive or the like.

The uniting portion 59C, which is disposed along a flat surface of the cover body 30, includes linear end portions 595 connected to the cap bodies 59A, 59B and an intermediate portion 596 connecting the end portions 595 to each other.

The intermediate portion 596 includes: linear portions 596A perpendicular to the end portions 595 and disposed along the linear portion of the plate 39 facing the step 38; and a rounded portion 596B integral with the linear portions 596A and disposed along the outer circumferential surface of the cylindrical portion 33.

The third exemplary embodiment provides the following advantageous effect (23) in addition to the advantageous effects (1), (3), (8) and (10) to (19) of the first exemplary embodiment.

(23) Regarding the two cap bodies 59A, 59B, the cap body 59A includes: the outer wall 591 having the inner circumferential surface engageable with the outer circumferential surface of the step 38; and the top plate 592 connected to the base edge of the outer wall 591, and the cap body 59B includes: the conical portion 593 having the outer surface engageable with the inner circumferential surface of the operation hole 32A; and the top plate 594 connected to the base end of the conical portion 593. The uniting portion 59C includes an elastic linear member connecting the outer wall 591 of the cap body 59A and the top plate 594 of the cap body 59B. With the above arrangement, when the cap body 59A is removed from the operation hole 32A, the pair of cap bodies 59A, 59B can be prevented from being lost as long as the cap body 59B is attached to the operation hole 32A. The operation holes 32A includes an operation hole requiring waterproofing, which is provided to the step 38 to enhance a waterproof effect. Since the cap bodies 59A, 59B have the different shapes, the cap bodies 59A, 59B are each prevented from being attached to wrong one of the operation holes 32A.

Incidentally, it should be understood that the scope of the invention is not limited to the above exemplary embodiments, but includes modifications and improvements compatible with the invention.

For instance, in the above exemplary embodiments, the substrate body 70 includes the first substrate 701 and the second substrate 702, but may alternatively include a single substrate or three or more substrates.

Further, the holder 9 and the support projections 35 are not requisite for the invention, and thus, for instance, an edge of the substrate body 70 may be bonded to the joint.

In the above exemplary embodiments, the two electronic adjusting units 72 intended for span adjustment and for zero adjustment are provided, but the electronic adjusting units 72 may alternatively be intended for linearity correction and for dampener without departing the scope of the invention.

Further, the number of the electronic adjusting units 72 may be not two but three or more, and the three or more electronic adjusting units 72 may each include the operable portion 72A. Alternatively, the number of the electronic adjusting units 72 may be one. In this case, a plurality of operable portions 72A may be provided.

According to the invention, the number of the cap bodies 51, 57, 59A, 59B is determined in accordance with the number of the operable portions 72A, and thus it is not necessary that the number of the cap bodies 51, 57, 59A, 59B is two as in the above exemplary embodiments.

In the above exemplary embodiments, the description is made on the physical quantity measuring device configured to measure a pressure, but the invention is applicable to, for instance, a differential pressure sensor and a temperature sensor in addition to the physical quantity measuring device.

In the first exemplary embodiment, the retaining portion 530 includes the split portion 531 formed by splitting the second end of the linear loss-preventing member 53 and the adhesive 532 provided to a gap between split ends of the split portion 531. Alternatively, a retaining portion may be a nut screwed on a thread provided to the end of the linear loss-preventing member 53 without departing the scope of the invention.

In the second exemplary embodiment, two operation holes 37A may be provided to the cover member 37, and the cap member may include cap bodies attached to the two operation holes 37A and a plate-shaped uniting portion uniting the cap bodies to each other.

In the third exemplary embodiment, the cap bodies 59A, 59B have the different shapes, but may alternatively have the same shape without departing the scope of the invention.

What is claimed is:

1. A physical quantity measuring device comprising:
   a cylindrical case having a first open end and a second open end;
   a detector provided to the first open end of the case to detect a physical quantity of a fluid to be measured;
   a cover member attached to the second open end of the case;
   a circuit board disposed in the case, the circuit board comprising:
      an electronic circuit unit configured to detect a detection signal from the detector; and
      an electronic adjusting unit configured to adjust the electronic circuit unit, the electronic adjusting unit comprising a plurality of operable portions;
   a signal transmitting member mounted on the cover member and connected to the circuit board, the cover member being provided with a mount hole for mounting the signal transmitting member and at least two operation holes allowing the plurality operable portions to be operated to adjust the electronic adjusting unit; and
   a cap member provided to the cover member to cover the at least two operation holes, the cap member comprising:
      a plurality of cap portions removably attachable to the at least two operation holes; and
      a uniting portion configured to unite the cap portions.

2. The physical quantity measuring device according to claim 1, further comprising an elastic linear loss-preventing member having a first end connected to the uniting portion and a second end engageable with the cover member.

3. The physical quantity measuring device according to claim 2, wherein
   the cover member comprises:
   a cover body having a bottom surface facing an inside of the case; and
   a step projecting from a surface of the cover body opposite with the bottom surface, the step defining therein the operation holes and a hole portion for inserting the linear loss-preventing member, the hole portion being disposed between adjacent ones of the operation holes and penetrating through the step and the cover body,
   the cap portions each comprise:
   an outer wall having an inner circumferential surface engageable with an outer circumferential surface of the step;
   an inner wall having an outer circumferential surface engageable with an inner circumferential surface of one of the operation holes; and
   a top plate connected to a base edge of the outer wall and a base edge of the inner wall,
   the uniting portion comprises a uniting plate integral with the top plate, and
   the first end of the linear loss-preventing member is connected to the uniting plate, whereas the second end of the linear loss-preventing member is engageable with the hole portion.

4. The physical quantity measuring device according to claim 3, wherein the linear loss-preventing member comprises a retaining portion at the second end thereof, the retaining portion being configured to prevent the second end of the linear loss-preventing member from coming out of the case through the hole portion.

5. The physical quantity measuring device according to claim 3, wherein
   the cover member further comprises a cylindrical portion disposed adjacent to the step, the cylindrical portion defining therein the mount hole for the signal transmitting member,
   the cap member further comprises a recess shaped in conformity with an outer circumferential shape of the cylindrical portion, and
   the top plate is provided with an identification sign for identifying the plurality of operable portions.

6. The physical quantity measuring device according to claim 1, wherein
   the cover member comprises:
   a cover body having a bottom surface, the cover body being provided with the at least two operation holes; and
   a step projecting from an outer surface of the cover body opposite with the bottom surface, the at least two operation holes being partly defined in the step,
   the plurality of cap portions comprises a first cap portion and a second cap portion,
   the first cap portion comprises:
   an outer wall having an inner circumferential surface engageable with an outer circumferential surface of the step; and
   a top plate connected to a base edge of the outer wall,
   the second cap portion comprises:
   a conical portion having an outer circumferential surface engageable with an inner circumferential surface of one of the at least two operation holes; and
   a top plate connected to a base end of the conical portion, and
   the uniting portion comprises an elastic linear member configured to connect the outer wall of the first cap portion and the top plate of the second cap portion.

7. A physical quantity measuring device comprising:
   a cylindrical case having a first open end and a second open end;

a detector provided to the first open end of the case to detect a physical quantity of a fluid to be measured;
a cover member attached to the second open end of the case;
a circuit board disposed in the case, the circuit board comprising:
   an electronic circuit unit configured to detect a detection signal from the detector; and
   an electronic adjusting unit configured to adjust the electronic circuit unit, the electronic adjusting unit comprising a plurality of operable portions;
a signal transmitting member mounted on the cover member and connected to the circuit board, the cover member being provided with a mount hole for mounting the signal transmitting member and at least one operation hole allowing the plurality of operable portions to be operated to adjust the electronic adjusting unit;
a cap member provided to the cover member to cover the at least one operation hole, the cap member comprising:
   a plurality of cap portions removably attachable to the at least one operation hole; and
   a uniting portion configured to unite the cap portions; and
an elastic linear loss-preventing member having a first end connected to the uniting portion and a second end engageable with the cover member, wherein
the cover member further comprises an indentation having a bottom surface provided with the at least one operation hole,
the cap portions each further comprise:
an outer wall having an outer surface engageable with an inner circumferential surface of the indentation; and
a top plate connected to a base edge of the outer wall,
the uniting portion further comprises:
a uniting plate integral with the top plate; and
a uniting wall integral with the outer wall, the uniting wall having a base edge connected to the uniting plate, and
the first end of the linear loss-preventing member is connected to a distal edge of the outer wall, whereas the second end of the linear loss-preventing member is engageable with the cover member.

8. The physical quantity measuring device according to claim 7, wherein when the cap member is attached to the indentation, an outer periphery of the top plate and an outer periphery of the uniting plate define an inclined surface continuous with an outer surface of the cover member opposite with the bottom surface.

9. A method of manufacturing a physical quantity measuring device, comprising:
   attaching a detector to a first open end of a cylindrical case, the detector being configured to detect a physical quantity of a fluid to be measured;
   attaching a signal transmitting member to a mount hole of a cover member;
   providing a step to a cover body of the cover member such that the step projects from a surface of the cover body, the step defining therein at least two operation holes and a hole portion between adjacent ones of the operation holes and penetrating through the step and the cover body;
   after providing a cap member comprising a plurality of cap portions and a uniting portion configured to unite the cap portions and connecting a first end of an elastic linear loss-preventing member to the uniting portion, attaching the cap member to the cover member such that the cap portions are removably attachable to the at least two operation holes to cover the at least two operation holes, by inserting the linear loss-preventing member into the hole portion until a second end of the linear loss-preventing member is exposed from a bottom-side open end of the hole portion, and subsequently, providing a retaining portion on the second end of the linear loss-preventing member, the retaining portion being configured to prevent the second end of the linear loss-preventing member from coming out of the case through the hole portion;
   connecting the signal transmitting member to a circuit board, the circuit board comprising an electronic circuit unit configured to detect a detection signal from the detector and an electronic adjusting unit configured to adjust the electronic circuit unit, the electronic adjusting unit comprising a plurality of operable portions;
   installing the circuit board inside the case such that the plurality of operable portions are allowed to be operated through the at least two operation holes to adjust the electronic adjusting unit; and
   bonding the cover member to a second open end of the case, wherein
   the cover body has a bottom surface facing an inside of the case;
   the step projects from a surface of the cover body opposite with the bottom surface;
   the cap portions each comprise:
      an outer wall having an inner circumferential surface engageable with an outer circumferential surface of the step;
      an inner wall having an outer circumferential surface engageable with an inner circumferential surface of one of the operation holes; and
      a top plate connected to a base edge of the outer wall and a base edge of the inner wall, and
   the uniting portion comprises a uniting plate integral with the top plate.

* * * * *